US011918536B2

(12) United States Patent
Mooney et al.

(10) Patent No.: US 11,918,536 B2
(45) **Date of Patent: *Mar. 5, 2024**

(54) REAL-TIME FEEDBACK-BASED OPTIMIZATION OF AN EXOSKELETON

(71) Applicant: Dephy, Inc., Maynard, MA (US)

(72) Inventors: Luke Mooney, Sudbury, MA (US); Jean-François Duval, Belmont, MA (US); Rachel Harris, Cambridge, MA (US); Jonathan Kaplan, Waltham, MA (US)

(73) Assignee: Dephy, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/867,162

(22) Filed: Jul. 18, 2022

(65) Prior Publication Data

US 2022/0347040 A1 Nov. 3, 2022

Related U.S. Application Data

(63) Continuation of application No. 17/136,333, filed on Dec. 29, 2020, now Pat. No. 11,389,367.

(Continued)

(51) Int. Cl.
*A61H 3/00* (2006.01)

(52) U.S. Cl.
CPC ......... *A61H 3/00* (2013.01); *A61H 2003/007* (2013.01); *A61H 2201/1207* (2013.01);

(Continued)

(58) Field of Classification Search
CPC ............. B25J 9/0006; A61H 3/00–068; A61H 2003/001–065; A61H 2201/1207;

(Continued)

(56) References Cited

U.S. PATENT DOCUMENTS

| | | | |
|---|---|---|---|
| 2,477,591 | A | 8/1949 | Follis |
| 2,516,872 | A | 8/1950 | Hauser et al. |

(Continued)

FOREIGN PATENT DOCUMENTS

| | | | |
|---|---|---|---|
| CA | 2937610 | A1 | 7/2009 |
| CN | 202679044 | U | 1/2013 |

(Continued)

OTHER PUBLICATIONS

International Preliminary Report on Patentability on PCT Appl. Ser. No. PCT/US2021/047252 dated Mar. 9, 2023 (9 pages).

(Continued)

*Primary Examiner* — Valerie L Woodward
*Assistant Examiner* — Paige Kathleen Bugg
(74) *Attorney, Agent, or Firm* — Foley & Lardner LLP

(57) ABSTRACT

Systems and methods for determining a level of collaboration between a user and an exoskeleton boot are provided. A device, using an exoskeleton boot, can provide a level of force to a limb of a user to aid movement of the limb. The device can measure one or more parameters of the exoskeleton boot during the movement of the limb using the exoskeleton boot. The device can determine one or more biometrics of the user during the movement of the limb using the exoskeleton boot. The device can determine, based on the one or more biometrics and the one or more parameters of the device, a metric indicative of a collaboration between the user and the exoskeleton boot during the movement.

20 Claims, 16 Drawing Sheets

Related U.S. Application Data

(60) Provisional application No. 63/035,166, filed on Jun. 5, 2020.

(52) U.S. Cl.
CPC ................ *A61H 2201/1642* (2013.01); *A61H 2201/165* (2013.01); *A61H 2201/5061* (2013.01); *A61H 2201/5064* (2013.01); *A61H 2201/5069* (2013.01); *A61H 2201/5079* (2013.01); *A61H 2201/5082* (2013.01); *A61H 2201/5084* (2013.01); *A61H 2230/605* (2013.01); *A61H 2230/625* (2013.01)

(58) Field of Classification Search
CPC ...... A61H 2201/1642; A61H 2201/165; A61H 2201/5061; A61H 2201/5064; A61H 2201/5069; A61H 2201/5079; A61H 2201/5082; A61H 2201/5084; A61H 2230/605; A61H 2230/625
USPC .............................................................. 601/5
See application file for complete search history.

(56) References Cited

U.S. PATENT DOCUMENTS

| | | | |
|---|---|---|---|
| 2,573,698 | A | 11/1951 | Ellery |
| 3,064,644 | A | 11/1962 | Patterson |
| 5,490,831 | A | 2/1996 | Myers et al. |
| 5,685,830 | A | 11/1997 | Bonutti |
| 6,299,588 | B1 | 10/2001 | Fratrick |
| 6,872,187 | B1 | 3/2005 | Stark et al. |
| 7,153,242 | B2 | 12/2006 | Goffer |
| 7,431,737 | B2 | 10/2008 | Ragnarsdottir et al. |
| 7,531,006 | B2 | 5/2009 | Clausen et al. |
| 7,628,766 | B1 | 12/2009 | Kazerooni et al. |
| 7,811,333 | B2 | 10/2010 | Jonsson et al. |
| 8,114,168 | B2 | 2/2012 | Olafsson et al. |
| 8,435,309 | B2 | 5/2013 | Gilbert et al. |
| 8,516,918 | B2 | 8/2013 | Jacobsen et al. |
| 8,585,620 | B2 | 11/2013 | McBean et al. |
| 8,597,369 | B2 | 12/2013 | Hansen et al. |
| 8,734,528 | B2 | 5/2014 | Herr et al. |
| 8,764,850 | B2 | 7/2014 | Hansen et al. |
| 8,784,350 | B2 | 7/2014 | Cohen |
| 8,790,282 | B2 | 7/2014 | Jung et al. |
| 8,801,802 | B2 | 8/2014 | Oddsson et al. |
| 8,864,846 | B2 | 10/2014 | Herr et al. |
| 8,870,801 | B2 | 10/2014 | Tomiyama et al. |
| 8,870,967 | B2 | 10/2014 | Herr et al. |
| 9,017,419 | B1 | 4/2015 | Landry et al. |
| 9,066,819 | B2 | 6/2015 | Gramnaes |
| 9,078,774 | B2 | 7/2015 | Jonsson et al. |
| 9,198,821 | B2 | 12/2015 | Unluhisarcikli et al. |
| 9,333,097 | B2 | 5/2016 | Herr et al. |
| 9,339,397 | B2 | 5/2016 | Herr et al. |
| 9,345,608 | B2 | 5/2016 | Phillips |
| 9,480,618 | B2 | 11/2016 | Hsiao-Wecksler et al. |
| 9,539,117 | B2 | 1/2017 | Herr et al. |
| 9,554,922 | B2 | 1/2017 | Casler et al. |
| 9,662,262 | B2 | 5/2017 | Hollander et al. |
| 9,693,883 | B2 | 7/2017 | Herr et al. |
| 9,707,104 | B2 | 7/2017 | Clausen |
| 9,737,419 | B2 | 8/2017 | Herr et al. |
| 9,808,390 | B2 | 11/2017 | Caires et al. |
| 9,839,552 | B2 | 12/2017 | Han et al. |
| 9,872,782 | B2 | 1/2018 | Herr et al. |
| 9,907,722 | B2 | 3/2018 | Aguirre-Ollinger et al. |
| 9,925,071 | B2 | 3/2018 | Langlois et al. |
| 9,980,873 | B2 | 5/2018 | Tung et al. |
| 10,195,057 | B2 | 2/2019 | Clausen |
| 10,251,762 | B2 | 4/2019 | Langlois |
| 10,307,271 | B2 | 6/2019 | Holgate et al. |
| 10,307,272 | B2 | 6/2019 | Herr et al. |
| 10,335,294 | B2 | 7/2019 | Huang et al. |
| 10,369,023 | B2 | 8/2019 | Simon et al. |
| 10,405,996 | B2 | 9/2019 | Langlois |
| 10,406,002 | B2 | 9/2019 | Herr et al. |
| 10,426,637 | B2 | 10/2019 | Tong et al. |
| 10,463,561 | B2 | 11/2019 | Zhang et al. |
| 10,485,681 | B2 | 11/2019 | Herr et al. |
| 10,532,000 | B1 | 1/2020 | De Sapio et al. |
| 10,537,449 | B2 | 1/2020 | Han et al. |
| 10,561,563 | B2 | 2/2020 | Herr et al. |
| 10,576,620 | B1 | 3/2020 | Chou et al. |
| 11,413,210 | B2 | 8/2022 | Contreras-Vidal et al. |
| 2006/0184280 | A1 | 8/2006 | Oddsson et al. |
| 2007/0225620 | A1 | 9/2007 | Carignan et al. |
| 2009/0030530 | A1 | 1/2009 | Martin |
| 2009/0210093 | A1* | 8/2009 | Jacobsen .................. A61H 3/00 700/260 |
| 2010/0198124 | A1 | 8/2010 | Bhugra |
| 2010/0231206 | A1 | 9/2010 | Kobayashi |
| 2011/0066088 | A1 | 3/2011 | Little et al. |
| 2012/0089063 | A1 | 4/2012 | Olson et al. |
| 2012/0256381 | A1 | 10/2012 | Bradshaw |
| 2012/0289870 | A1 | 11/2012 | Hsiao-Wecksler et al. |
| 2013/0090580 | A1 | 4/2013 | Hong et al. |
| 2013/0226048 | A1 | 8/2013 | Unluhisarcikli et al. |
| 2013/0231595 | A1 | 9/2013 | Zoss et al. |
| 2014/0100494 | A1 | 4/2014 | Sarkodie-Gyan et al. |
| 2014/0330431 | A1 | 11/2014 | Hollander et al. |
| 2015/0141878 | A1* | 5/2015 | Roy ......................... A61H 1/02 601/34 |
| 2015/0164731 | A1* | 6/2015 | Kwak .................... A61H 1/024 623/25 |
| 2015/0173993 | A1 | 6/2015 | Walsh et al. |
| 2015/0196403 | A1 | 7/2015 | Kim et al. |
| 2015/0257902 | A1 | 9/2015 | Martin |
| 2016/0107309 | A1 | 4/2016 | Walsh et al. |
| 2016/0143800 | A1 | 5/2016 | Hyung et al. |
| 2016/0278948 | A1 | 9/2016 | Piercy et al. |
| 2016/0331557 | A1* | 11/2016 | Tong ..................... A61F 2/6607 |
| 2016/0331624 | A1 | 11/2016 | Sankai et al. |
| 2017/0043482 | A1 | 2/2017 | Hyun et al. |
| 2017/0119132 | A1 | 5/2017 | Pruess et al. |
| 2017/0202724 | A1 | 7/2017 | De Rossi et al. |
| 2017/0354529 | A1 | 12/2017 | Han et al. |
| 2018/0104075 | A1 | 4/2018 | Mooney et al. |
| 2018/0116826 | A1 | 5/2018 | Byars et al. |
| 2018/0125738 | A1 | 5/2018 | Witte et al. |
| 2018/0177665 | A1 | 6/2018 | Rogozinski |
| 2018/0193172 | A1 | 7/2018 | Smith et al. |
| 2018/0200135 | A1 | 7/2018 | Tung et al. |
| 2018/0325764 | A1 | 11/2018 | Yagi |
| 2019/0011743 | A1 | 1/2019 | Yan et al. |
| 2019/0038448 | A1 | 2/2019 | Choi et al. |
| 2019/0070060 | A1 | 3/2019 | Choi et al. |
| 2019/0083002 | A1 | 3/2019 | Jang et al. |
| 2019/0105215 | A1 | 4/2019 | Dalley et al. |
| 2019/0125004 | A1 | 5/2019 | Thomas et al. |
| 2019/0159728 | A1 | 5/2019 | Pritchard et al. |
| 2019/0159954 | A1 | 5/2019 | Ozsecen et al. |
| 2019/0160321 | A1 | 5/2019 | Ozsecen et al. |
| 2019/0175365 | A1 | 6/2019 | Herr et al. |
| 2019/0183713 | A1 | 6/2019 | Sankai |
| 2019/0254908 | A1 | 8/2019 | Ortlieb et al. |
| 2019/0254909 | A1 | 8/2019 | Lee et al. |
| 2019/0282429 | A1 | 9/2019 | Son et al. |
| 2019/0314185 | A1* | 10/2019 | Yuge ...................... A63B 23/08 |
| 2019/0328552 | A1 | 10/2019 | Herr et al. |
| 2019/0328604 | A1* | 10/2019 | Contreras-Vidal .......................... A61H 1/0244 |
| 2019/0343707 | A1 | 11/2019 | Riener et al. |
| 2019/0343710 | A1 | 11/2019 | Lerner |
| 2019/0365554 | A1 | 12/2019 | Davies-Sekle |
| 2020/0011406 | A1* | 1/2020 | Julin ........................ B25J 9/109 |
| 2020/0016020 | A1 | 1/2020 | Mooney et al. |
| 2020/0018589 | A1 | 1/2020 | Ausserlechner |
| 2020/0093679 | A1 | 3/2020 | Sonar et al. |
| 2020/0197253 | A1 | 6/2020 | Park et al. |
| 2020/0253772 | A1 | 8/2020 | Reid et al. |
| 2020/0253774 | A1 | 8/2020 | Pismennaya et al. |
| 2020/0276698 | A1 | 9/2020 | Ding et al. |

(56) References Cited

U.S. PATENT DOCUMENTS

| | | | | |
|---|---|---|---|---|
| 2020/0326780 | A1 | 10/2020 | Kearney et al. | |
| 2021/0085554 | A1* | 3/2021 | Roh | G06F 1/3212 |
| 2021/0121355 | A1 | 4/2021 | Behboodi et al. | |
| 2021/0290470 | A1 | 9/2021 | Farris et al. | |
| 2021/0291355 | A1 | 9/2021 | Lerner et al. | |
| 2021/0369536 | A1 | 12/2021 | Mooney et al. | |
| 2021/0393467 | A1 | 12/2021 | Ookoba | |
| 2022/0031552 | A1 | 2/2022 | Mooney et al. | |
| 2022/0110814 | A1 | 4/2022 | Mooney et al. | |
| 2022/0273469 | A1 | 9/2022 | Kazerooni et al. | |

FOREIGN PATENT DOCUMENTS

| | | | |
|---|---|---|---|
| CN | 105213155 | A | 1/2016 |
| CN | 103813772 | B | 7/2016 |
| CN | 104644381 | B | 8/2016 |
| CN | 104983543 | B | 8/2016 |
| CN | 107115191 | A | 9/2017 |
| CN | 107874984 | A | 4/2018 |
| CN | 105213153 | B | 6/2018 |
| CN | 105963100 | B | 7/2018 |
| CN | 108283564 | A | 7/2018 |
| CN | 108338896 | A | 7/2018 |
| CN | 108451748 | A | 8/2018 |
| CN | 106491319 | B | 12/2018 |
| CN | 105456004 | B | 2/2019 |
| CN | 109646245 | A | 4/2019 |
| CN | 209107991 | U | 7/2019 |
| CN | 209270231 | | 8/2019 |
| CN | 110327189 | A | 10/2019 |
| CN | 110478191 | A | 11/2019 |
| CN | 110575350 | A | 12/2019 |
| EP | 2 621 413 | B1 | 6/2014 |
| EP | 2 564 817 | B1 | 1/2019 |
| IN | 201631013395 | A | 10/2017 |
| JP | 5935177 | B2 | 6/2016 |
| KR | 20140107029 | A | 9/2014 |
| WO | WO-2016/180073 | A1 | 11/2016 |
| WO | WO-2016/182473 | A1 | 11/2016 |
| WO | WO-2018/023109 | A1 | 2/2018 |
| WO | WO-2019/160532 | A1 | 8/2019 |

OTHER PUBLICATIONS

Dollar et al., "Active Orthoses for the Lower-Limbs: Challenges and State of the Art," IEEE, Jan. 14, 2008, pp. 968-977.
Dollar et al., "Lower Extremity Exoskeletons and Active Orthoses: Challenges and State-of-the-Art," IEEE, Feb. 25, 2008, pp. 144-158.
Goldfarb et al., "Design of a Controlled-Brake Orthosis for FES-aided Gait," IEEE, vol. 4, No. 1, Mar. 1996, pp. 13-24.
Haque et al., "Design and Preliminary Testing of an Instrumented Exoskeleton for Walking Gait Measurement," IEEE, Apr. 12, 2019, 6 pages.
International Preliminary Report on Patentability on PCT Appl. Ser. No. PCT/US2020/059866 dated May 27, 2022 (14 pages).
International Preliminary Report on Patentability on PCT Appl. Ser. No. PCT/US2021/034086 dated Dec. 15, 2022 (10 pages).
International Preliminary Report on Patentability on PCT Appl. Ser. No. PCT/US2021/034163 dated Dec. 15, 2022 (6 pages).
International Preliminary Report on Patentability on PCT Appl. Ser. No. PCT/US2021/034182 dated Dec. 15, 2022 (5 pages).
International Preliminary Report on Patentability on PCT Appl. Ser. No. PCT/US2021/034252 dated Dec. 15, 2022 (14 pages).
International Search Report and the Written Opinion on PCT Appl. Ser. No. PCT/US2020/059866 dated Feb. 4, 2021 (8 pages).
International Search Report and the Written Opinion on PCT Appl. Ser. No. PCT/US2021/034086 dated Jun. 28, 2021 (11 pages).
International Search Report and the Written Opinion on PCT Appl. Ser. No. PCT/US2021/034163 dated Jun. 25, 2021 (7 pages).
International Search Report and the Written Opinion on PCT Appl. Ser. No. PCT/US2021/034182 dated Jun. 29, 2021 (6 pages).
International Search Report and the Written Opinion on PCT Appl. Ser. No. PCT/US2021/034252 dated Jun. 28, 2021 (15 pages).
International Search Report and the Written Opinion on PCT Appl. Ser. No. PCT/US2021/047252 dated Nov. 23, 2021 (10 pages).
International Search Report and the Written Opinion on PCT Appl. Ser. No. PCT/US2021/047295 dated Sep. 23, 2021 (7 pages).
Kim et al., "Mechanical Design of the Hanyang Exoskeleton Assistive Robot (HEXAR)," Dec. 18, 2014, IEEE, pp. 479-484.
Pirjade et al., "Design and Fabrication of a Low-cost Human Body Lower Limb Exoskeleton," IEEE, Apr. 16, 2020, pp. 32-37.
Sanz-Morere et al., "A Knee-Ankle-Foot Orthosis to Assist the Sound Limb of Transfemoral Amputees," IEEE, vol. 1, No. 1, Feb. 13, 2019, pp. 38-48.
U.S. Final Office Action on U.S. Appl. No. 17/028,761 dated Mar. 16, 2021 (18 pages).
U.S. Final Office Action on U.S. Appl. No. 17/136,333 dated Jun. 21, 2021 (27 pages).
U.S. Non-Final Office Action on U.S. Appl. No. 17/022,982 dated May 4, 2021 (19 pages).
U.S. Non-Final Office Action on U.S. Appl. No. 17/028,761 dated Nov. 23, 2020 (18 pages).
U.S. Non-Final Office Action on U.S. Appl. No. 17/028,761 dated Oct. 12, 2021 (24 pages).
U.S. Non-Final Office Action on U.S. Appl. No. 17/136,333 dated Mar. 12, 2021 (24 pages).
U.S. Non-Final Office Action on U.S. Appl. No. 17/136,333 dated Nov. 23, 2021 (28 pages).
U.S. Non-Final Office Action on U.S. Appl. No. 17/504,261 dated Dec. 20, 2022 (9 pages).
U.S. Non-Final Office Action on U.S. Appl. No. 17/526,454 dated Jan. 12, 2023 (22 pages).
U.S. Notice of Allowance on U.S. Appl. No. 17/022,982 dated Jan. 29, 2021 (12 pages).
U.S. Notice of Allowance on U.S. Appl. No. 17/022,982 dated Sep. 27, 2021 (9 pages).
U.S. Notice of Allowance on U.S. Appl. No. 17/028,761 dated Feb. 2, 2022 (10 pages).
U.S. Notice of Allowance on U.S. Appl. No. 17/084,111 dated Feb. 19, 2021 (13 pages).
U.S. Notice of Allowance on U.S. Appl. No. 17/084,111 dated May 20, 2021 (8 pages).
U.S. Notice of Allowance on U.S. Appl. No. 17/084,111 dated Sep. 16, 2021 (7 pages).
U.S. Notice of Allowance on U.S. Appl. No. 17/109,911 dated Feb. 3, 2021 (10 pages).
U.S. Notice of Allowance on U.S. Appl. No. 17/109,911 dated May 25, 2021 (5 pages).
U.S. Notice of Allowance on U.S. Appl. No. 17/109,911 dated Sep. 14, 2021 (5 pages).
U.S. Notice of Allowance on U.S. Appl. No. 17/136,333 dated Apr. 6, 2022 (13 pages).
Witte et al., "Design of Two Lightweight, High-Bandwidth Torque-Controlled Ankle Exoskeletons," IEEE International Conference on Robotics and Automation (ICRA), May 26, 2015 (6 pages).
Xie et al., "An Unpowered Flexible Lower Limb Exoskeleton: Walking Assisting and Energy Harvesting," IEEE, vol. 24, No. 5, Oct. 5, 2019, pp. 2236-2247.
Zhang et al., "Experimental comparison of torque control methods on an ankle exoskeleton during human walking," IEEE International Conference on Robotics and Automation (ICRA), May 26, 2015 (6 pages).
Zhou et al., "Preliminary Evaluation of Gait Assistance During Treadmill Walking with a Light-weight Bionic Knee Exoskeleton," IEEE, Dec. 7, 2016, pp. 1173-1178.
U.S. Corrected Notice of Allowance on U.S. Appl. No. 17/504,261 dated Apr. 24, 2023 (2 pages).
U.S. Notice of Allowance on U.S. Appl. No. 17/526,454 dated Apr. 26, 2023 (8 pages).
U.S. Corrected Notice of Allowance on U.S. Appl. No. 17/504,261 dated May 18, 2023 (2 pages).
U.S. Non-Final Office Action on U.S. Appl. No. 17/504,248 dated Jun. 7, 2023 (12 pages).

(56) References Cited

OTHER PUBLICATIONS

International Preliminary Report on Patentability on PCT Appl. Ser. No. PCT/US2021/047295 dated Mar. 30, 2023 (5 pages).
U.S. Final Office Action on U.S. Appl. No. 17/526,454 dated Apr. 7, 2023 (6 pages).
U.S. Notice of Allowance on U.S. Appl. No. 17/504,261 dated Apr. 7, 2023 (9 pages).
U.S. Non-Final Office Action on U.S. Appl. No. 17/002,556 dated Aug. 21, 2023 (107 pages).
EP Office Action on EP Appl. Ser. No. 20888375.1 dated Sep. 14, 2023 (7 pages).

* cited by examiner

REAL-TIME FEEDBACK-BASED OPTIMIZATION OF AN EXOSKELETON

CROSS-REFERENCES TO RELATED APPLICATIONS

This application claims the benefit of priority under 35 U.S.C. § 120 as a continuation of U.S. patent application Ser. No. 17/136,333, filed Dec. 29, 2020, which claims the benefit of priority under 35 U.S.C. § 119 to U.S. Provisional Patent Application No. 63/035,166, filed on Jun. 5, 2020, titled "SYSTEMS AND METHODS FOR REAL-TIME CONTROL OPTIMIZATION OF AN EXOSKELETON," each of which is hereby incorporated herein by reference in its entirety.

BACKGROUND

Exoskeletons can be worn by a user to facilitate movement of limbs of the user.

SUMMARY

Systems, methods and devices of this technical solution are directed to determining a collaboration metric or interaction metric between a user and an exoskeleton device. A determination can be made identifying how well the exoskeleton (or multiple exoskeletons) and user wearing the exoskeletons are working together and interacting to perform a movement and/or complete a task (e.g., walk, run, jump). The exoskeleton device, such as but not limited to, an exoskeleton boot can be worn by a user on each lower limb (e.g., right leg, left leg) to aid the user in performing movements and/or activities (e.g., walking, running, hiking). The exoskeleton boots can provide force or torque to the respective limb to reduce an amount of force provided by the user to perform the movement and reduce a physiological impact on the user during the movement. A controller can determine how well the user is performing, how well the exoskeleton device is performing and a collaboration metric indicating the relationship and quality of interaction between the user and the exoskeleton device in performing one or more movements and/or completing a task.

In at least one aspect, a method for determining a level of collaboration between a user and an exoskeleton boot is provided. The method can include providing, by a device using an exoskeleton boot, a level of force to a limb of a user to aide movement of the limb. The method can include measuring, by the device, one or more parameters of the exoskeleton boot during the movement of the limb using the exoskeleton boot. The method can include determining, by the device, one or more biomechanical measurements of the user during the movement of the limb using the exoskeleton boot. The method can include determining, by the device based on the one or more biomechanical measurements and the one or more parameters of the device, a metric indicative of a collaboration between the user and the exoskeleton boot during the movement.

In embodiments, the method can include generating, by the device based on the metric, modifications to the one or more parameters of the device for one or more subsequent movements of the limb using the exoskeleton boot. The parameters of the exoskeleton boot can include at least one of: torque, velocity, battery power, mechanical power, damping or stiffness. In some embodiments, determining the one or more biomechanical measurements of the user can include determining, by the device, a kinematic value for the movement indicative of a transfer of energy between the exoskeleton boot to the limb of the user during the movement. The kinematic value can include at least one of: a linear velocity of the limb, an angular velocity of the limb, a linear acceleration of the limb, an angular acceleration of the limb, a gait symmetry, a step length, a cadence of the limb, an angle of a joint, an angular velocity of a joint, or an angular acceleration of a joint. The metric indicative of collaboration can include at least one of: a kinetic value for the level of force provided to the limb, a mechanical power provided by the exoskeleton boot to the limb, a motor current of the exoskeleton, or a battery power of the exoskeleton during the movement.

In embodiments, the method can include modifying, by the device based on the metric, a level of a mechanical power provided by the exoskeleton boot to the limb during one or more subsequent movements to maintain a determined ratio between the level of the mechanical power and a battery power of the exoskeleton during the one or more subsequent movement. The method can include modifying, by the device based on the metric, a level of a battery power of the exoskeleton during one or more subsequent movements to maintain a determined ratio between the level of the battery power and a mechanical power provided by the exoskeleton boot to the limb during the one or more subsequent movements. The method can include determining, by the device, a velocity of a joint of the user is greater than threshold. The method can include modifying, by the device responsive to the determination, a level of mechanical power provided by the exoskeleton boot to the limb during the activity. The method can include modifying, by the device responsive to the determination, a level of torque provided by the exoskeleton boot to the limb during the activity.

In embodiments, the method can include determining, by the device, a velocity of a joint of the user is greater than threshold. The method can include increasing, by the device responsive to the determination, a level of mechanical power provided by the exoskeleton boot to the limb during the activity. The method can include decreasing, by the device responsive to the increase in the level of the mechanical power, a level of the battery power of the exoskeleton boot. The method can include determining, by the device using a step length of the user and a step period of the user, a gait speed of the user during the movement of the limb using the exoskeleton boot. The method can include modifying, by the device responsive to the step length, a level of the battery power of the exoskeleton boot. The method can include determining, by the device, a temperature of the exoskeleton boot responsive to the movement of the limb using the exoskeleton boot. The method can include modifying, by the device and based on the temperature, a level of mechanical power provided by the exoskeleton boot to the limb during one or more subsequent movements of the limb using the exoskeleton boot.

In at least one aspect, a method for determining a level of collaboration between a user and an exoskeleton boot is provided. The method can include providing, by a device using an exoskeleton boot, a level of force to a limb of a user to perform a movement. The method can include measuring, by the device responsive to the provided level of force, kinematic metrics of the movement of the limb using the exoskeleton boot. The method can include measuring, by the device responsive to the provided level of force, kinetic metrics of the movement of the limb using the exoskeleton boot. The method can include determining, by the device based on the kinetic metrics and the kinematic metrics, a performance value of the limb using the exoskeleton boot, the performance value indicative of a collaboration between the user and the exoskeleton boot during the movement.

In embodiments, the method can include determining, by the device using a joint velocity of the limb during the movement, a time to apply actuation to the limb using the exoskeleton boot during the movement. The method can include applying, by the device to the limb using the exoskeleton boot, actuation during the movement. The method can include modifying, by the device responsive to actuation, a level of the battery power of the exoskeleton boot. In embodiments, the method can include modifying, by the device based on the kinetic metrics and the kinematic metrics, at least one of a level of mechanical power provided by the exoskeleton boot to the limb during the movement or a torque provided by the exoskeleton boot to the limb during the movement. The method can include modifying, by the device based on the kinematic metrics, one or more parameters of the exoskeleton boot to alter a gait of the user for one or more subsequent movements using the exoskeleton boot.

In at least one aspect, a device for determining a level of collaboration between a user and an exoskeleton boot is provided. The device can include a processor coupled to memory. The processor can be configured to provide, using the exoskeleton boot, a level of force to a limb of a user to aide movement of the limb. The processor can be configured to measure one or more parameters of the exoskeleton boot during the movement of the limb using the exoskeleton boot. The processor can be configured to determine one or more biomechanical measurements of the user during the movement of the limb using the exoskeleton boot. The processor can be configured to determine, based on the one or more biomechanical measurements and the one or more parameters of the device, a metric indicative of a collaboration between the user and the exoskeleton boot during the movement.

In embodiments, the processor can be configured to generate, based on the metric, modifications to the one or more parameters of the device for one or more subsequent movements of the limb using the exoskeleton boot. The processor can be configured to determine a kinematic value for the movement indicative of a transfer of energy between the exoskeleton boot to the limb of the user during the movement. The kinematic value can include at least one of: a linear velocity of the limb, an angular velocity of the limb, a linear acceleration of the limb, an angular acceleration of the limb, a gait symmetry, a step length, a cadence of the limb, an angle of a joint, an angular velocity of a joint, or an angular acceleration of a joint. The processor can be configured to modify, based on the metric, a level of a mechanical power provided by the exoskeleton boot to the limb during one or more subsequent movements to maintain a determined ratio between the level of the mechanical power and a battery power of the exoskeleton during the one or more subsequent movement.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

This disclosure relates generally to performance enhancing wearable technologies. Particularly, this disclosure relates to apparatus, systems and methods for providing customized configuration for a controller of an exoskeleton device through a user application and/or user feedback.

I. Exoskeleton Overview

Exoskeletons (e.g., battery-powered active exoskeleton, battery-powered active exoskeleton boot, lower limb exoskeleton, knee exoskeleton, or back exoskeleton) can include devices worn by a person to augment physical abilities. Exoskeletons can be considered passive (e.g., not requiring an energy source such as a battery) or active (e.g., requiring an energy source to power electronics and usually one or many actuators). Exoskeletons may be capable of providing large amounts of force, torque and/or power to the human body in order to assist with motion.

Exoskeletons can transfer energy to the user or human. Exoskeletons may not interfere with the natural range of motion of the body. For example, exoskeletons can allow a user to perform actions (e.g., walking, running, reaching, or jumping) without hindering or increasing the difficulty of performing these actions. Exoskeletons can reduce the difficulty of performing these actions by reducing the energy or effort the user would otherwise exert to perform these actions. Exoskeletons can convert the energy into useful mechanical force, torque, or power. Onboard electronics (e.g., controllers) can control the exoskeleton. Output force and torque sensors can also be used to make controlling easier.

Figure 1:
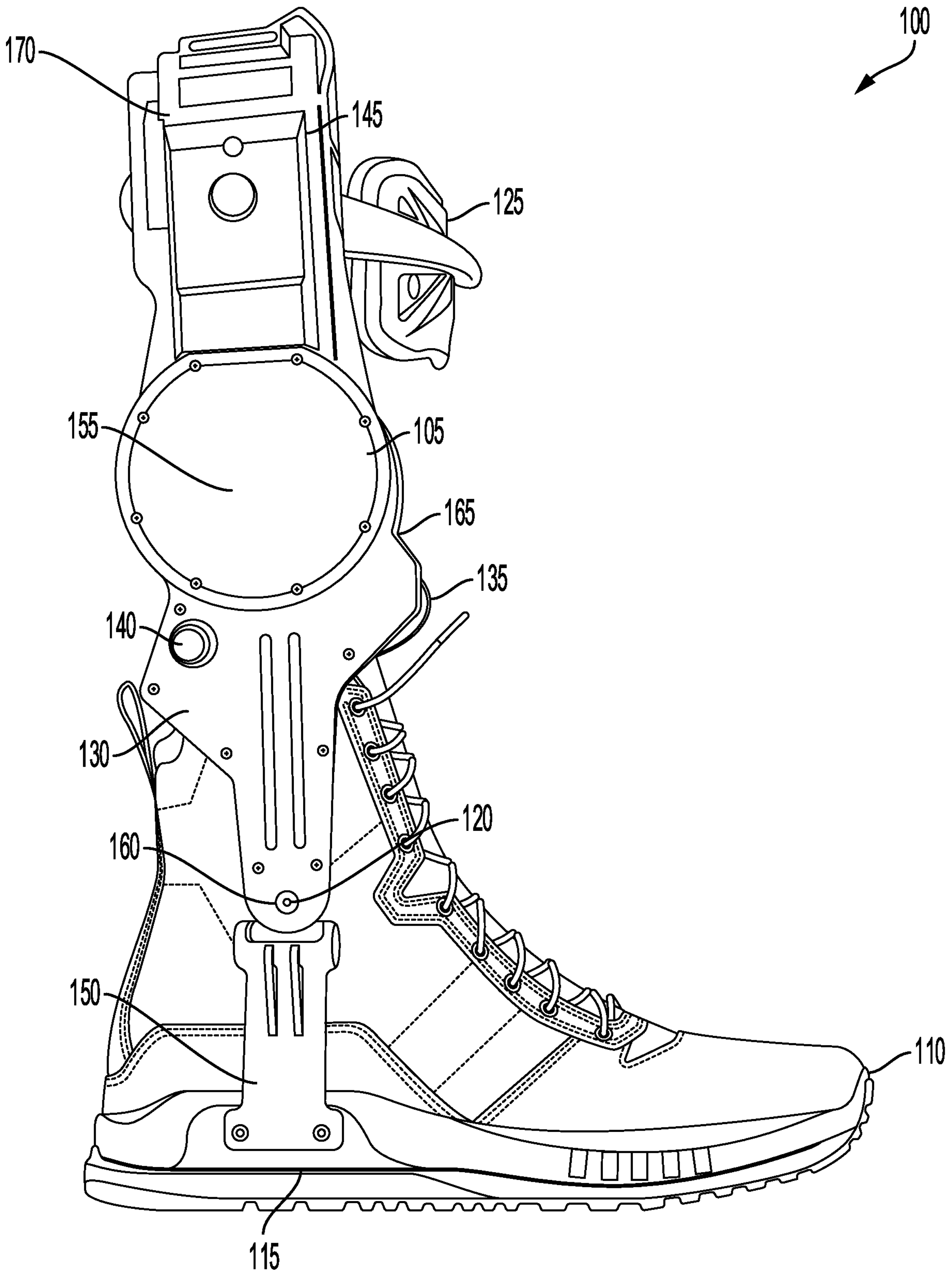
FIG. 1 illustrates a schematic diagram of an exoskeleton, according to an embodiment.

FIG. 1 illustrates a schematic diagram of an exoskeleton 100. The exoskeleton 100 can be referred to as a lower limb exoskeleton, lower limb exoskeleton assembly, lower limb exoskeleton system, ankle exoskeleton, ankle foot orthosis, knee exoskeleton, hip exoskeleton, exoskeleton boot, or exoboot. The exoskeleton 100 can include a water resistant active exoskeleton boot. For example, the exoskeleton 100 can resist the penetration of water into the interior of the exoskeleton 100. The exoskeleton 100 can include a water resistant active exoskeleton boot. For example, the exoskeleton 100 can be impervious to liquids (e.g., water) and non-liquids (e.g., dust, dirt, mud, sand, or debris). The exoskeleton 100 can remain unaffected by water or resist the ingress of water, such as by decreasing a rate of water flow into the interior of the exoskeleton 100 to be less than a target rate indicative of being water resistant or waterproof. For example, the exoskeleton 100 can operate in 3 feet of water for a duration of 60 minutes. The exoskeleton 100 can have an ingress protection rating (IP) rating of 68. The exoskeleton 100 can have a National Electrical Manufacturer Association (NEMA) rating of 4×, which can indicate that the exoskeleton 100 has a degree of protection with respect to harmful effects on the equipment due to the ingress of water (e.g., rain, sleet, snow, splashing water, and hose directed water), and that the exoskeleton can be undamaged by the external formation of ice on the enclosure.

The exoskeleton 100 can include a shin pad 125 (e.g., shin guard). The shin pad 125 can be coupled to a shin of a user below a knee of the user. The shin pad 125 can be coupled to the shin of the user to provide support. The shin pad 125 can include a piece of equipment to protect the user from injury. For example, the shin pad 125 can protect the lower extremities of the user from external impact. The shin pad 125 can interface with the shin of the user. The shin pad 125 can include a band (e.g., adjustable band) configured to wrap around the shin of the user. The shin pad 125 can secure the upper portion of the exoskeleton 100 to the body of the user. The shin pad 125 can secure or help secure the exoskeleton 100 to the shin, leg, or lower limb of the user. The shin pad 125 can provide structural integrity to the exoskeleton 100. The shin pad 125 can support other components of the exoskeleton 100 that can be coupled to the shin pad 125. The shin pad 125 can be made of lightweight, sturdy, and/or water resistant materials. For example, the shin pad 125 can be made of plastics, aluminum, fiberglass, foam rubber, polyurethane, and/or carbon fiber.

The exoskeleton 100 can include one or more housings 105. At least one of the one or more housings 105 can be coupled to the shin pad 125 below the knee of the user. The shin pad 125 can be coupled to the at least one housing via a shin lever. The shin lever can extend from the at least one housing to the shin pad 125. The shin lever can include a mechanical structure that connects the shin pad 125 to a chassis. The chassis can include a mechanical structure that connects static components.

The one or more housings 105 can enclose electronic circuitry (e.g., electronic circuitry 505). The one or more housings 105 can encapsulate some or all the electronics of the exoskeleton 100. The one or more housings 105 can include an electronics cover (e.g., case). The one or more housings 105 can enclose an electric motor (e.g., motor 330). The electric motor can generate torque about an axis of rotation of an ankle joint of the user. The ankle joint can allow for dorsiflexion and/or plantarflexion of the user's foot. The exoskeleton 100 can include an ankle joint component 120 that rotates about the axis of rotation the ankle joint. The ankle joint component 120 can be positioned around or adjacent to the ankle joint.

The exoskeleton 100 can include a rotary encoder 155 (e.g., shaft encoder, first rotary encoder, or motor encoder). The rotary encoder 155 can be enclosed within the one or more housings 105. The rotary encoder 155 can measure an angle of the electric motor. The angle of the electric motor can be used by the controller to determine an amount of torque applied by the exoskeleton 100. For example, the angle of the electric motor can correspond to an amount of torque applied by the exoskeleton 100. An absolute angle of the electric motor can correspond to an amount of torque applied by the exoskeleton 100. The rotary encoder 155 can include an inductive encoder. The ankle joint component 120 can be actuated by a motor (e.g., electric motor). The rotary encoder 155 can include a contactless magnetic encoder or an optical encoder.

The exoskeleton 100 can include a second rotary encoder 160 (e.g., ankle encoder). The second rotary encoder 160 can measure an angle of the ankle joint. The angle of the ankle joint can be used by the controller to determine an amount of torque applied by the exoskeleton 100. The second rotary encoder 160 can include a first component enclosed in the one or more housings 105 and in communication with the electronic circuitry 505. The second rotary encoder 160 can include a second component located outside the one or more housings 105 and configured to interact with the first component. The second rotary encoder 160 can include a contactless magnetic encoder, a contactless inductive encoder, or an optical encoder. The second rotary encoder 160 can detect the angle of the ankle joint while the rotary encoder 155 can detect the angle of the electric motor. The angle of the electric motor can be different from the angle of the ankle joint. The angle of the electric motor can be independent of the angle of the ankle joint. The angle of the ankle joint can be used to determine an output (e.g., torque) of the electric motor. The ankle joint component 120 can be coupled to the second rotary encoder 160.

The one or more housings 105 can encapsulate electronics that are part of the exoskeleton 100. The one or more housings 105 can form a fitted structure (e.g., clamshell structure) to enclose the electronic circuitry and the electric motor. The fitted structure can be formed from two or more individual components. The individual components of the fitted structure can be joined together to form a single unit. The one or more housings 105 can be formed of plastic or metal (e.g., aluminum). An adhesive sealant can be placed between individual components of the fitted structure and under the electronics cover. A gasket can be placed between individual components of the fitted structure and under the electronics cover. The gasket can be placed in the seam between the individual components of the fitted structure.

A sealant 165 can be placed in contact with the one or more housings 105 to close the one or more housings 105 and prevent an ingress of water into the one or more housings 105. The sealant 165 used to close the one or more housings 105 can include an adhesive sealant (e.g., super glue, epoxy resin, or polyvinyl acetate). The adhesive sealant can include a substance used to block the passage of fluids through the surface or joints of the one or more housings 105. The sealant 165 used to close the one or more housings 105 can include epoxy. The sealant 165 can permanently seal or close the one or more housings 105. For example, the sealant 165 can seal or close the one or more housings 105 such that the one or more housings are not removably attached to one another.

The exoskeleton 100 can couple with a boot 110. For example, the exoskeleton 100 can be attached to the boot 110. The boot 110 can be worn by the user. The boot 110 can be connected to the exoskeleton 100. The exoskeleton 100 can be compatible with different boot shapes and sizes.

The exoskeleton 100 can include an actuator 130 (e.g., actuator lever arm, or actuator module). The actuator 130 can include one or more of the components in the exoskeleton 100. For example, the actuator 130 can include the one or more housings 105, the footplate 115, the ankle joint component 120, the actuator belt 135, and the post 150, while excluding the boot 110. The boot 110 can couple the user to the actuator 130. The actuator 130 can provide torque to the ground and the user.

The exoskeleton 100 can include a footplate 115 (e.g., carbon insert, carbon shank). The footplate 115 can include a carbon fiber structure located inside of the sole of the boot 110. The footplate 115 can be made of a carbon-fiber composite. The footplate 115 can be inserted into the sole of the boot 110. The footplate 115 can be used to transmit torque from the actuator 130 to the ground and to the user. The footplate 115 can be located in the sole of the exoskeleton 100. This footplate 115 can have attachment points that allow for the connection of the exoskeleton's mechanical structure. An aluminum insert with tapped holes and cylindrical bosses can be bonded into the footplate 115. This can create a rigid mechanical connection to the largely compliant boot structure. The bosses provide a structure that can be used for alignment. The footplate 115 can be sandwiched between two structures, thereby reducing the stress concentration on the part. This design can allow the boot to function as a normal boot when there is no actuator 130 attached.

The exoskeleton 100 can include an actuator belt 135 (e.g., belt drivetrain). The actuator belt 135 can include a shaft that is driven by the motor and winds the actuator belt 135 around itself. The actuator belt 135 can include a tensile member that is pulled by the spool shaft and applies a force to the ankle lever. Tension in the actuator belt 135 can apply a force to the ankle lever. The exoskeleton 100 can include an ankle lever. The ankle lever can include a lever used to transmit torque to the ankle. The exoskeleton 100 can be used to augment the ankle joint.

The exoskeleton 100 can include a power button 140 (e.g., switch, power switch). The power button 140 can power the electronics of the exoskeleton 100. The power button 140 can be located on the exterior of the exoskeleton 100. The power button 140 can be coupled to the electronics in the interior of the exoskeleton 100. The power button 140 can be electrically connected to an electronic circuit. The power button 140 can include a switch configured to open or close the electronic circuit. The power button 140 can include a low-power, momentary push-button configured to send power to a microcontroller. The microcontroller can control an electronic switch.

The exoskeleton 100 can include a battery holder 170 (e.g., charging station, dock). The battery holder 170 can be coupled to the shin pad 125. The battery holder 170 can be located below the knee of the user. The battery holder 170 can be located above the one or more housings 105 enclosing the electronic circuitry. The exoskeleton 100 can include a battery module 145 (e.g., battery). The battery holder 170 can include a cavity configured to receive the battery module 145. A coefficient of friction between the battery module 145 and the battery holder 170 can be established such that the battery module 145 is affixed to the battery holder 170 due to a force of friction based on the coefficient of friction and a force of gravity. The battery module 145 can be affixed to the battery holder 170 absent a mechanical button or mechanical latch. The battery module 145 can be affixed to the battery holder 170 via a lock, screw, or toggle clamp. The battery holder 170 and the battery module 145 can be an integrated component (e.g., integrated battery). The integrated battery can be supported by a frame of the exoskeleton 100 as opposed to having a separated enclosure. The integrated battery can include a charging port. For example, the charging port can include a barrel connector or a bullet connector. The integrated battery can include cylindrical cells or prismatic cells.

The battery module 145 can power the exoskeleton 100. The battery module 145 can include one or more electrochemical cells. The battery module 145 can supply electric power to the exoskeleton 100. The battery module 145 can include a power source (e.g., onboard power source). The power source can be used to power electronics and one or more actuators. The battery module 145 can include a battery pack. The battery pack can be coupled to the one or more housings 105 below a knee of the user. The battery pack can include an integrated battery pack. The integrated battery pack can remove the need for power cables, which can reduce the snag hazards of the system. The integrated battery pack can allow the system to be a standalone unit mounted to the user's lower limb. The battery module 145 can include a battery management system 324 to perform various operations. For example, the system can optimize the energy density of the unit, optimize the longevity of the cells, and enforce safety protocols to protect the user.

The battery module 145 can include a removable battery. The battery module 145 can be referred to as a local battery because it is located on the exoboot 100 (e.g., on the lower limb or below the knee of the user), as opposed to located on a waist or back of the user. The battery module 145 can include a weight-mounted battery, which can refer to the battery being held in place on the exoboots 100 via gravity and friction, as opposed to a latching mechanism. The battery module 145 can include a water resistant battery or a waterproof battery. The exoskeleton 100 and the battery module 145 can include water resistant connectors.

The battery module 145 can include a high-side switch (e.g., positive can be interrupted). The battery module 145 can include a ground that is always connected. The battery module 145 can include light emitting diodes (LEDs). For example, the battery module 145 can include three LEDs used for a user interface. The LEDs can be visible from one lens so that the LEDs appear as one multicolor LED. The LEDs can blink in various patterns and/or colors to communicate a state of the battery module 145 (e.g., fully charged, partially charged, low battery, or error).

The exoskeleton 100 can include a post 150. The post 150 can include a mechanical structure that connects to the boot 110. The post 150 can couple the ankle joint component 120 with the footplate 115. The post 150 can be attached at a first end to the footplate 115. The post 150 can be attached at a second end to the ankle joint component 120. The post 150 can pivot about the ankle joint component 120. The post 150 can include a mechanical structure that couples the footplate 115 with the ankle joint component 120. The post 150 can include a rigid structure. The post 150 can be removably attached to the footplate 115. The post 150 can be removably attached to the ankle joint component 120. For example, the post 150 can be disconnected from the ankle joint component 120.

The exoskeleton 100 can include a rugged system used for field testing. The exoskeleton 100 can include an integrated ankle lever guard (e.g., nested lever). The exoskeleton 100 can include a mechanical shield to guard the actuator belt 135 and ankle lever transmission from the environment. The housing structure of the system can extend to outline the range of travel of the ankle lever (e.g., lever arm 1140) on the lateral and medial side.

II. Active Exoskeleton with Local Battery

Exoskeletons 100 can transform an energy source into mechanical forces that augment human physical ability. Exoskeletons 100 can have unique power requirements. For example, exoskeletons 100 can use non-constant power levels, such as cyclical power levels with periods of high power (e.g., 100 to 1000 Watts) and periods of low or negative power (e.g., 0 Watts). Peaks in power can occur once per gait cycle. Batteries configured to provide power to the exoskeleton 100 can be the source of various issues. For example, batteries located near the waist of a user can require exposed cables that extend from the battery to the lower limb exoskeleton. These cables can introduce snag hazards, make the device cumbersome, and add mass to the system. Additionally, long cables with high peak power can result in excess radio emissions and higher voltage drops during high current peaks. Thus, systems, methods and apparatus of the present technical solution provide an exoskeleton with a local battery that can perform as desired without causing snag hazards, power losses, and radio interference. Additionally, the battery can be located close to the knee such that the mass felt by the user is reduced as compared to a battery located close the foot of the user.

Figure 2:
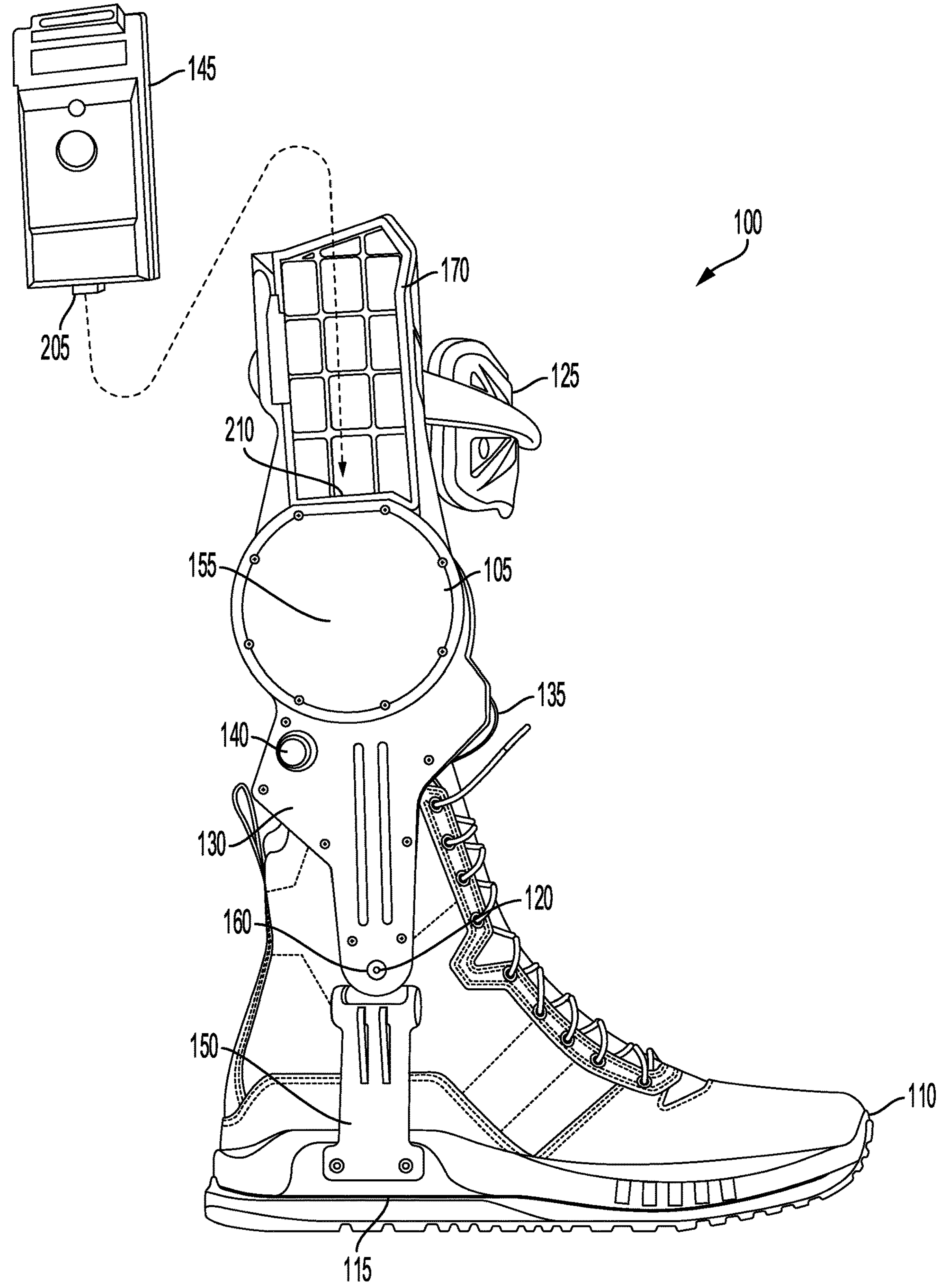
FIG. 2 illustrates a schematic diagram of an exoskeleton, according to an embodiment.

FIG. 2 illustrates a schematic diagram of the exoskeleton 100. The exoskeleton 100 includes the one or more housings 105, the boot 110 the footplate 115, the ankle joint component 120, shin pad 125, the actuator 130, the actuator belt 135, the power button 140, the battery module 145, the post 150, the rotary encoder 155, and the second rotary encoder 160. The battery module 145 can be inserted into the exoskeleton 100. The battery module 145 can include a sealed battery. The battery module 145 can coupled with the exoskeleton 100 via a waterproof or water resistant connection. The battery module 145 can connect locally (e.g., proximate) to the exoskeleton 100 such that a wire is not needed to run from the battery module 145 to the electronics.

The battery module 145 can be removably affixed to the battery holder 170. For example, the battery module 145 can slide in and out of the battery holder 170. By removably affixing the battery module 145 to the battery holder 170, the battery module 145 can be replaced with another battery module 145, or the battery module 145 can be removed for charging. The battery module 145 can include a first power connector 205 that electrically couples to a second power connector 210 located in the battery holder 170 while attached to the battery holder 170 to provide electric power to the electronic circuitry and the electric motor. The first power connector 205 and the second power connector 210 can couple (e.g., connect) the battery module 145 with the electronic circuitry. The first power connector 205 and the second power connector 210 can couple the battery module 145 with the one or more housings 105. The first power connector 205 can be recessed in the battery module 145 to protect the first power connector 205 from loading and impacts. The first power connector 205 and the second power connector 210 can include wires (e.g., two wires, three wires, or four wires). The battery module 145 can communicate with the electronic circuitry via the first power connector 205 and the second power connector 210. The first power connector 205 and the second power connector 210 can include an exposed connector.

The geometry of the battery module 145 can allow for storage and packing efficiency. The battery module 145 can include a gripping element to allow for ergonomic ease of removal and insertion of the battery module 145 into the battery holder 170. The battery module 145 can be made of lightweight plastics or metals. The battery module 145 can be made of heat insulating materials to prevent heat generated by the battery cells 305 from reaching the user. One or more faces of the battery module 145 can be made of metal to dissipate heat.

The exoskeleton 100 can communicate with the battery module 145 during operation. The exoskeleton 100 can use battery management system information to determine when safety measures will trigger. For example, during a high current peak (e.g., 15 A) or when the temperature is near a threshold, the power output can be turned off. The exoskeleton 100 can temporarily increase safety limits for very specific use cases (e.g., specific environmental conditions, battery life). The battery module 145 can prevent the exoskeleton 100 from shutting down by going into a low power mode and conserving power. The exoskeleton 100 can put the battery module 145 in ship mode if a major error is detected and the exoskeleton 100 wants to prevent the user from power cycling. The battery management system 324 can be adapted to support more or less series cells, parallel cells, larger capacity cells, cylindrical cells, different lithium chemistries, etc.

Figure 3:
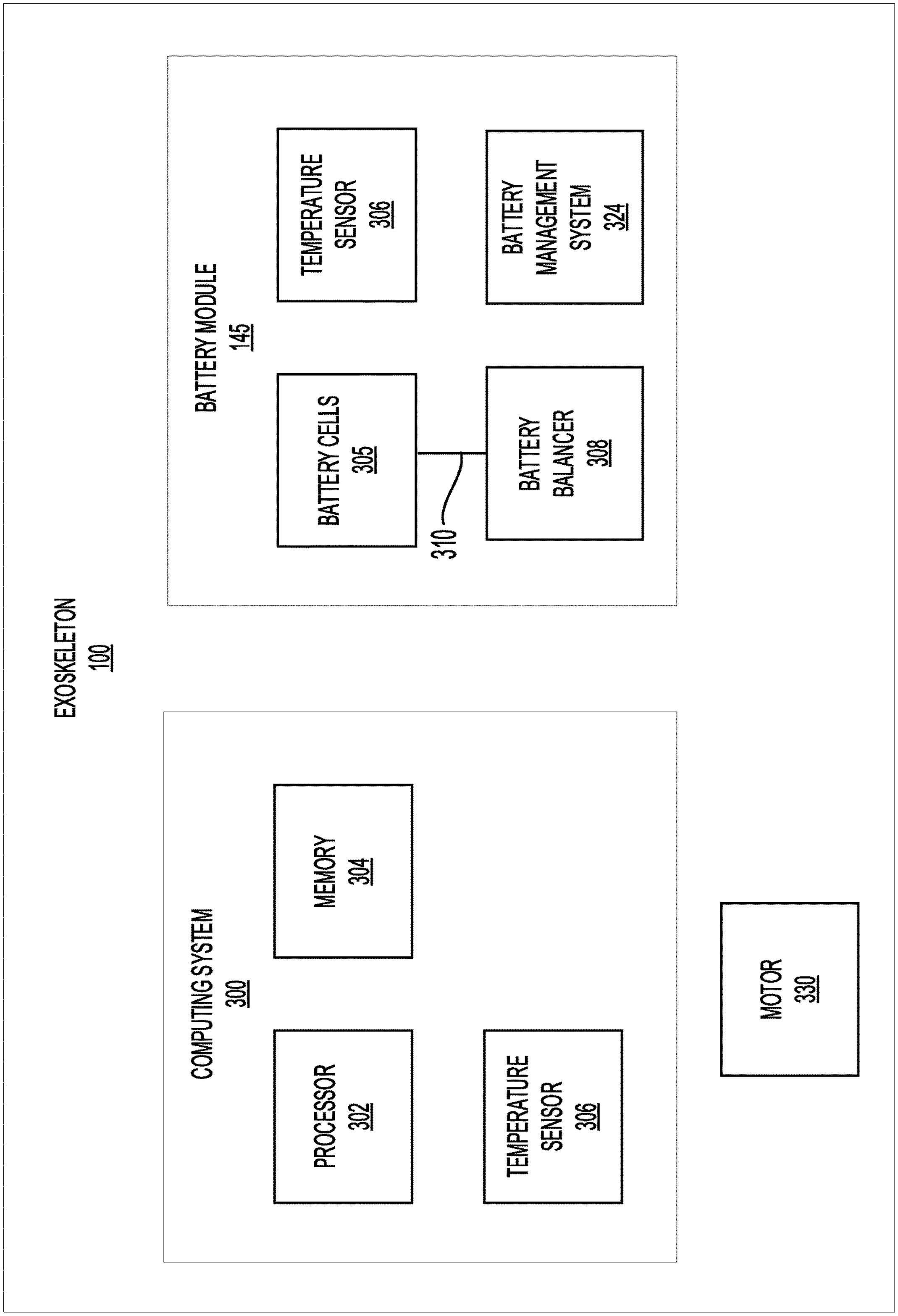
FIG. 3 illustrates a schematic diagram of an exoskeleton, according to an embodiment.

FIG. 3 illustrates a schematic diagram of an exoskeleton 100. The exoskeleton 100 can include a motor 330. The motor 330 can generate torque about an axis of rotation of an ankle joint of the user. The exoskeleton 100 can include the battery module 145. The exoskeleton 100 can include a computing system 300. The exoskeleton 100 can include one or more processors 302, memory 304, and one or more temperature sensors 306 (e.g., thermocouples). The one or more processors 302, memory 304, and one or more temperature sensor 306 can be located within the computing system 300. In some cases, the computing system 300 can include the batter balancer 308 as opposed to the battery module 145.

The one or more processors 302 can receive data corresponding to a performance of the battery module 145. The data can include one or more of a temperature, current, voltage, battery percentage, internal state or firmware version. The one or more processors 302 can determine, based on a safety policy, to trigger a safety action. The safety policy can include triggering the safety action if a threshold temperature, voltage or battery percentage is crossed. For example, the safety policy can include triggering the safety action if a temperature of one or more of the plurality of battery cells 305 is higher than a threshold temperature. The safety policy can include triggering the safety action if a battery percentage of the battery module 145 is below a threshold battery percentage. The safety policy can include triggering the safety action if a measured temperature is higher than the threshold temperature. The measured temperature can include the temperature of the printed circuit board and battery cells 305. The measured temperature can include the temperature of the printed circuit board and battery cells 305 measured in two locations. The safety policy can include triggering the safety action if a measured voltage is higher than the threshold voltage.

The one or more processors 302 can instruct, based on the safety action, the electronic circuitry to adjust delivery of power from the battery module 145 to the electric motor to reduce an amount of torque generated about the axis of rotation of the ankle joint of the user. The safety action can include lowering or reducing the amount of torque generated about the axis of rotation of the ankle joint of the user. The safety action can include increasing the amount of torque generated about the axis of rotation of the ankle joint of the user.

The one or more temperature sensors 306 can be placed between the plurality of battery cells 305 to provide an indication of a temperature between the plurality of battery cells 305. A temperature sensor of the one or more temperature sensors 306 can be mounted on the printed circuit board to measure a temperature of the printed circuit board. The electronic circuitry 505 can control the delivery of power from the battery module 145 to the electric motor based at least in part on the indication of the temperature between the plurality of battery cells 305 or the temperature of the printed circuit board.

The one or more battery balancers 308 can be configured to actively transfer energy from a first battery cell 305 of the plurality of battery cells 305 to a second battery cell 305 of the plurality of battery cells 305 having less charge than the first battery cell 305. A signal trace 310 can electrically connect the plurality of battery cells 305 to the one or more battery balancers 308. The signal trace 310 can be located on the printed circuit board.

The exoskeleton 100 can include the battery module 145. The battery module 145 can include a plurality of battery cells 305, one or more temperature sensors 306, one or more battery balancers 308, and a battery management system 324. The battery management system 324 can perform various operations. For example, the battery management system 324 can optimize the energy density of the unit, optimize the longevity of the cells 305, and enforce the required safety to protect the user. The battery management system 324 can go into ship mode by electrically disconnecting the battery module 145 from the rest of the system to minimize power drain while the system is idle. The battery management system 324 can go into ship mode if a major fault is detected. For example, if one or more of the plurality of battery cells 305 self-discharge at a rate higher than a threshold, the battery management system 324 can re-enable the charging port.

While these components are shown as part of the exoskeleton 100, they can be located in other locations such as external to the exoskeleton 100. For example, the battery management system 324 or the computing system 300 can be located external to the exoskeleton 100 for testing purposes.

Figure 4:
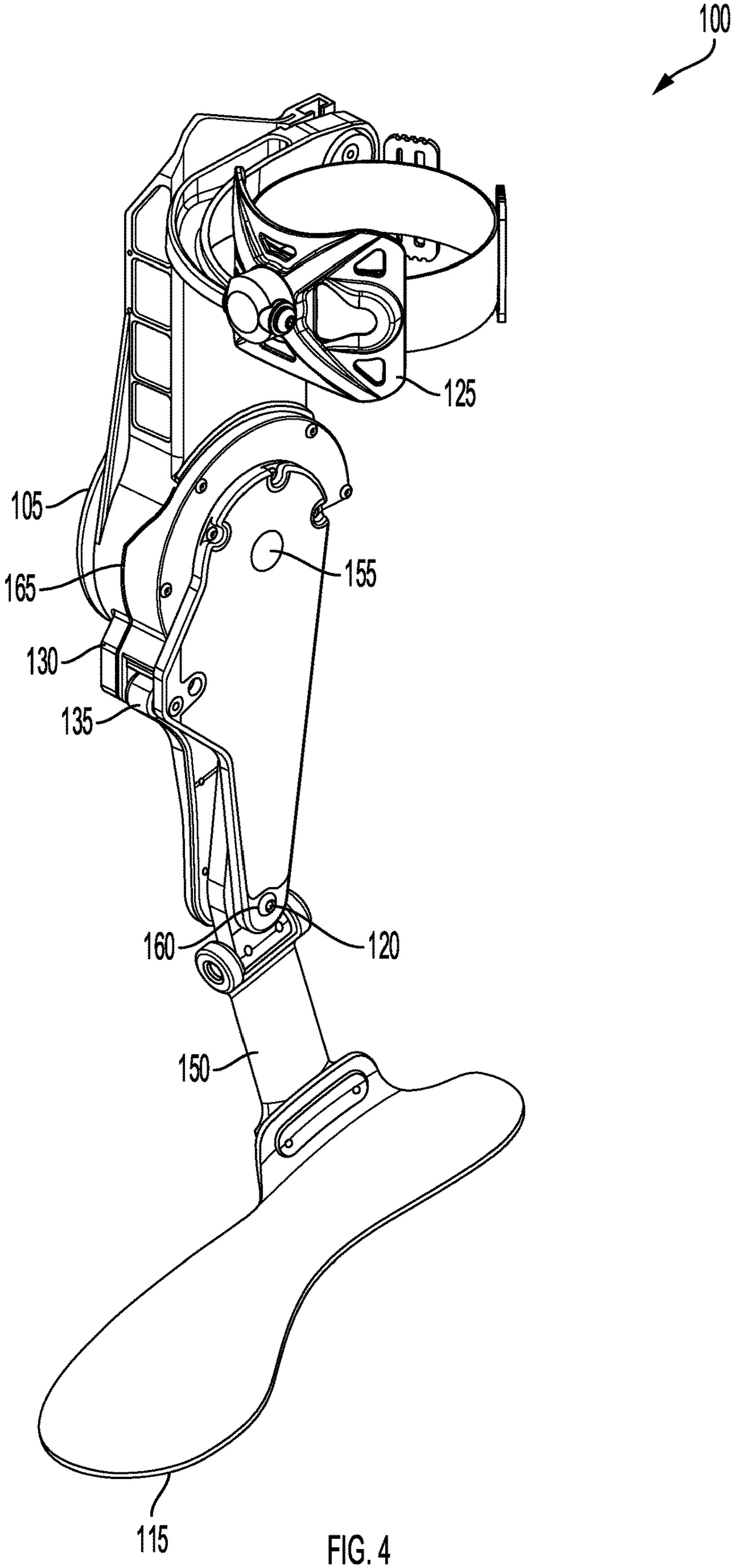
FIG. 4 illustrates a schematic diagram of an exoskeleton, according to an embodiment.

FIG. 4 illustrates a schematic diagram of the exoskeleton 100. The exoskeleton 100 can include the one or more housings 105, the footplate 115, the ankle joint component 120, shin pad 125, the actuator 130, the actuator belt 135, the post 150, the rotary encoder 155, the second rotary encoder 160, and the sealant 165 as described above. The one or more housings 105 can be coupled to the shin pad 125. The post 150 can couple the ankle joint component 120 with the footplate 115. The actuator 130 can include the one or more housings 105, the footplate 115, the ankle joint component 120, the actuator belt 135, and the post 150. The rotary encoder 155 can measure an angle of the electric motor. The second rotary encoder 160 can measure an angle of the ankle joint. The sealant 165 can be placed in contact with the one or more housings 105 to close the one or more housings 105 and prevent an ingress of water into the one or more housings 105.

Figure 5:
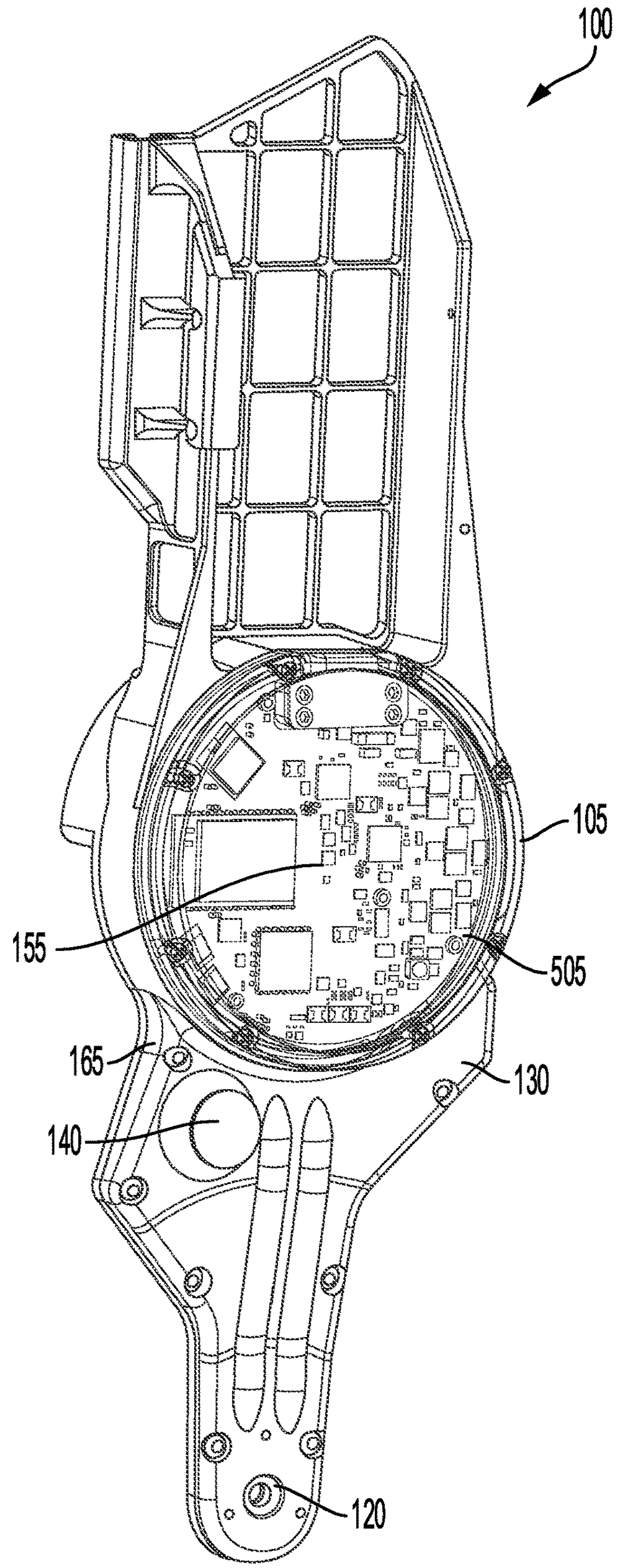
FIG. 5 illustrates a schematic diagram of the exoskeleton and internal parts, according to an embodiment.

FIG. 5 illustrates a schematic diagram of the exoskeleton 100 and internal parts. The exoskeleton 100 can include the one or more housings 105, the ankle joint component 120, the actuator 130, the power button 140, the rotary encoder 155, the second rotary encoder 160, and the sealant 165 as described above. The internal parts can include electronic circuitry 505 (e.g., electronic circuit, circuitry, electronics). The electronic circuitry 505 can include individual electronic components (e.g., resistors, transistors, capacitors, inductors, diodes, processors, or controllers). The power button 140 can be electrically connected to the electronic circuitry 505. The electronic circuitry 505 can be located behind the electric motor. The electronic circuitry 505 can include the main electronics board. The rotary encoder 155 can be located between the motor and electronic circuitry 505. The electronic circuitry 505 can control delivery of power from the battery module 145 to the electric motor to generate torque about the axis of rotation of the ankle joint of the user.

Figure 6:
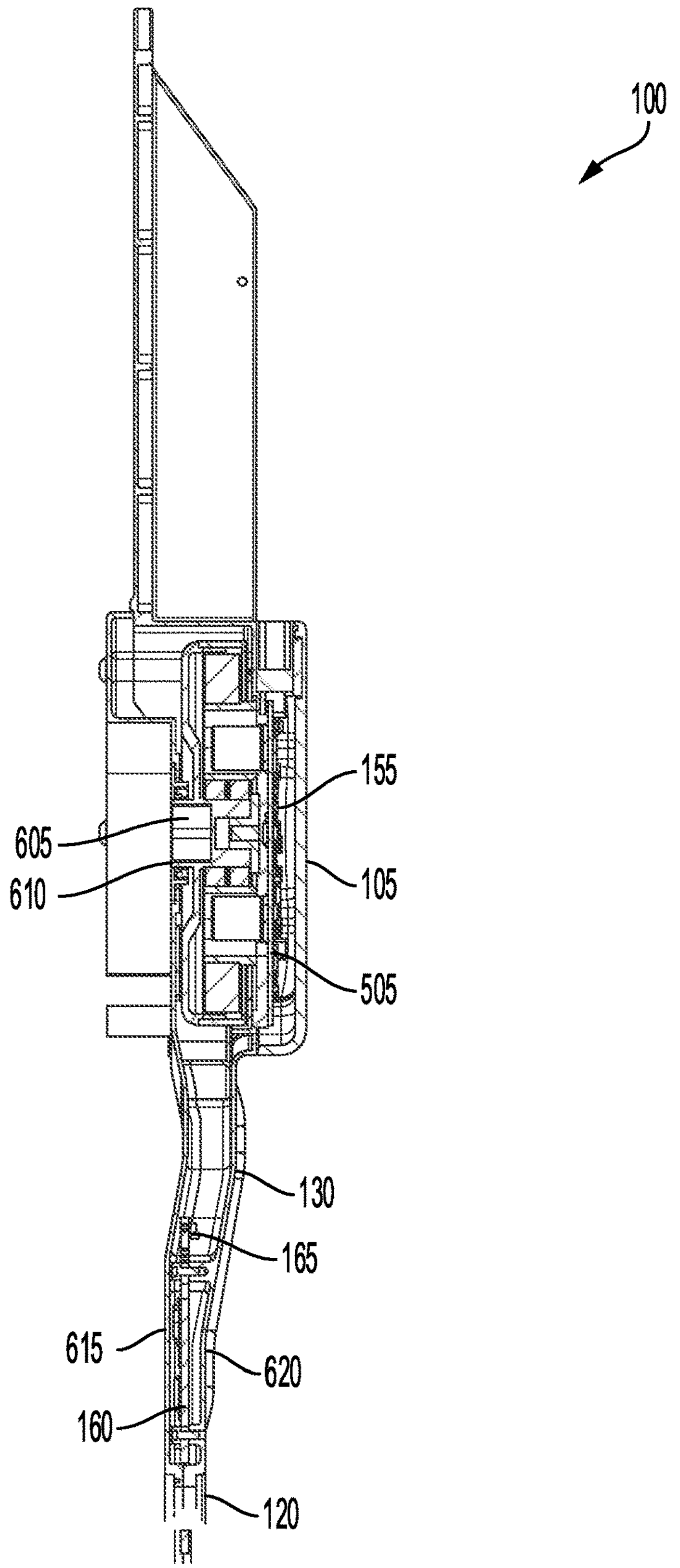
FIG. 6 illustrates a side view of an exoskeleton, according to an embodiment.

FIG. 6 illustrates a side view of the exoskeleton 100. The exoskeleton 100 can include the one or more housings 105, ankle joint component 120, the actuator 130, the rotary encoder 155, the second rotary encoder 160, the sealant 165, and electronic circuitry 505 as described above. The exoskeleton 100 can include an output shaft 605 (e.g., motor rotor, spool shaft, pinion gear, spur gear, or toothed pulley). The output shaft 605 can be coupled to the electric motor. The output shaft 605 can extend through a bore 610 in a housing of the one or more housings 105 enclosing the electric motor. The bore 610 can receive the output shaft 605. An encoder chip can be located on the electronics board on a first side of the electric motor. The encoder chip can measure the angular position of the rotary encoder 155. The exoskeleton 100 can include a transmission (e.g., gearbox) configured to couple the output shaft 605 to the electric motor. The transmission can include a machine in a power transmission system. The transmission can provide controlled application of power. The output shaft 605 can be integrated into the motor rotor. The output shaft 605 can be part of a mechanism (e.g., gears, belts, linkage, or change). An ankle shaft can extend through the second rotary encoder 160 which can increase the structural integrity of the exoskeleton 100.

The exoskeleton 100 can include a first component of the fitted structure 615 (e.g., first clamshell structure). The exoskeleton 100 can include a second component of the fitted structure 620 (e.g., second clamshell structure). The first component of the fitted structure 615 can be coupled with the second component of the fitted structure 620. The first component of the fitted structure 615 can be attached to the second component of the fitted structure 620 via the sealant 165 (e.g., adhesive sealant). The first component of the fitted structure 615 can be coupled to the second component of the fitted structure 620 such that the fitting prevents or decreases a rate of water flow into the interior of the exoskeleton 100. The fitted structure can include two or more components such that the assembly components prevents or decreases a rate of water flow into the interior of the exoskeleton 100. The first component of the fitted structure 615 and the second component of the fitted structure 620 can be stationary components. The number of individual components of the fitted structure can be minimized to decrease the number of possible entry points for water to enter the exoskeleton 100. The possible entry points can include seams and/or moving parts of the exoskeleton 100. The seams can be permanently sealed via the sealant 165.

An adhesive sealant (e.g., super glue, epoxy resin, or polyvinyl acetate) can be placed between the first component of the fitted structure 615 and the second component of the fitted structure 620. The adhesive sealant can prevent or decrease the rate of water flow through the seam between the first component of the fitted structure 615 and the second component of the fitted structure 620 into the interior of the exoskeleton 100. The adhesive sealant can be placed under the electronics cover. The adhesive sealant can prevent or decrease the rate of water flow through the seam between the electronics cover and the exoskeleton one or more housings 105 into the interior of the exoskeleton 100.

A gasket can be placed between the first component of the fitted structure 615 and the second component of the fitted structure 620. The gasket can be placed in the seam between the first component of the fitted structure 615 and the second component of the fitted structure 620. The gasket can prevent or decrease the rate of water flow through the seam between the first component of the fitted structure 615 and the second component of the fitted structure 620.

Figure 7:
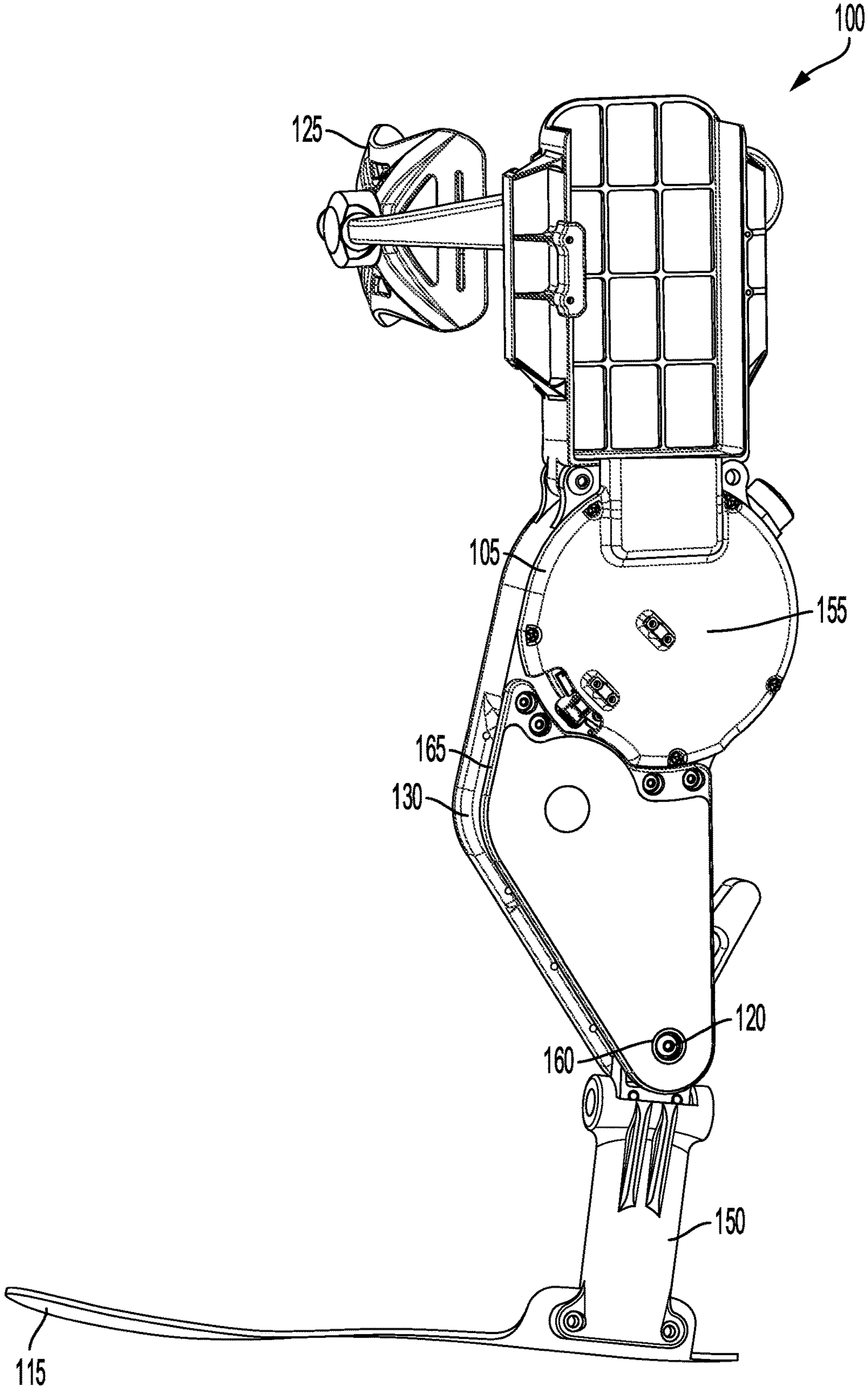
FIG. 7 illustrates a schematic diagram of an exoskeleton, according to an embodiment.

FIG. 7 illustrates a schematic diagram of the exoskeleton 100. The exoskeleton 100 can include the one or more housings 105, the footplate 115, the ankle joint component 120, the shin pad 125, the actuator 130, the post 150, the rotary encoder 155, the second rotary encoder 160, and the sealant 165 as described above. The one or more housings 105 can be coupled to the shin pad 125. The post 150 can couple the ankle joint component 120 with the footplate 115. The actuator 130 can include the one or more housings 105, the footplate 115, the ankle joint component 120, and the post 150. The rotary encoder 155 can measure an angle of the electric motor. The second rotary encoder 160 can measure an angle of the ankle joint.

Figure 8:
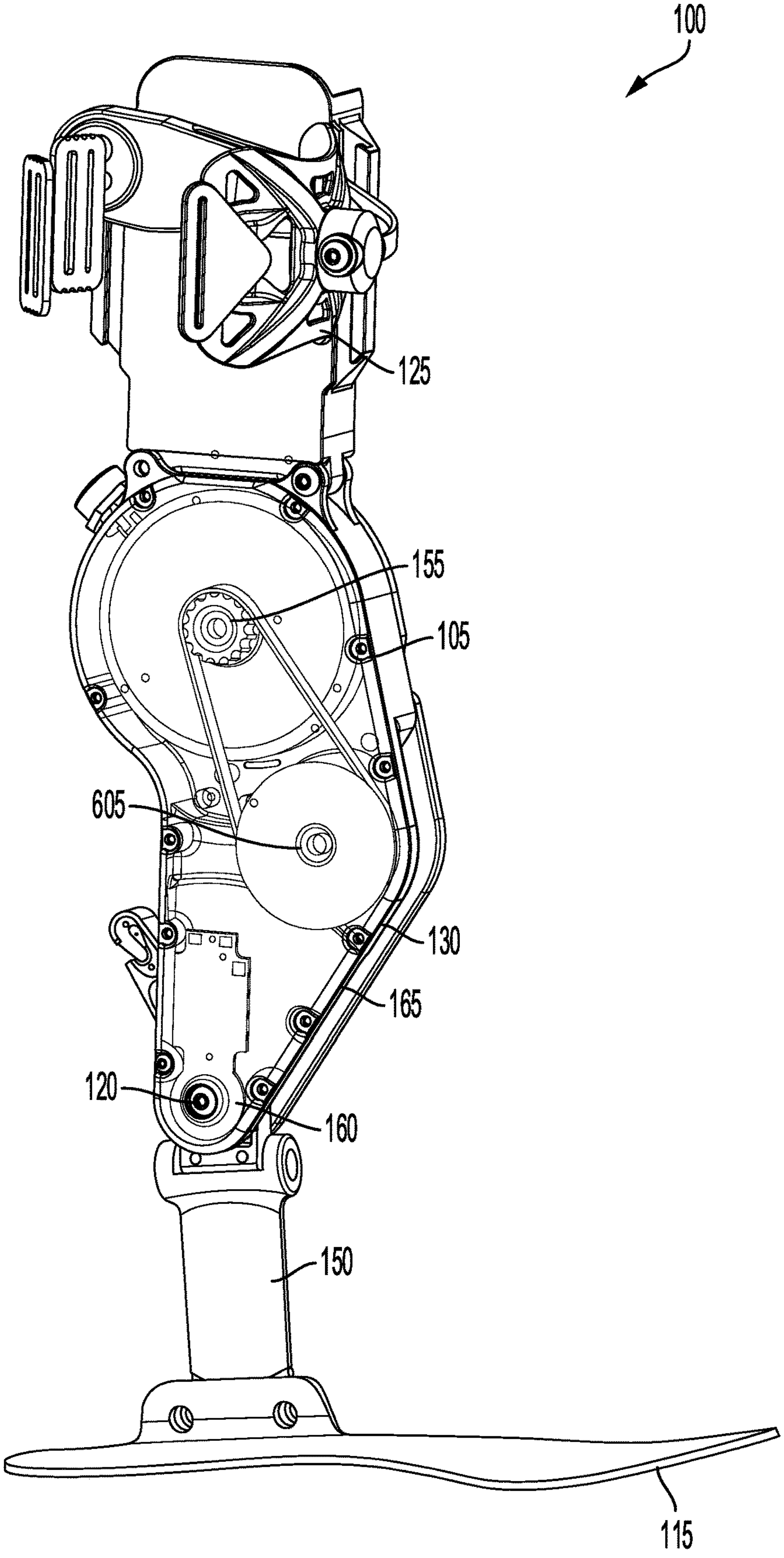
FIG. 8 illustrates a schematic diagram of an exoskeleton and internal parts, according to an embodiment.
Figure 9:
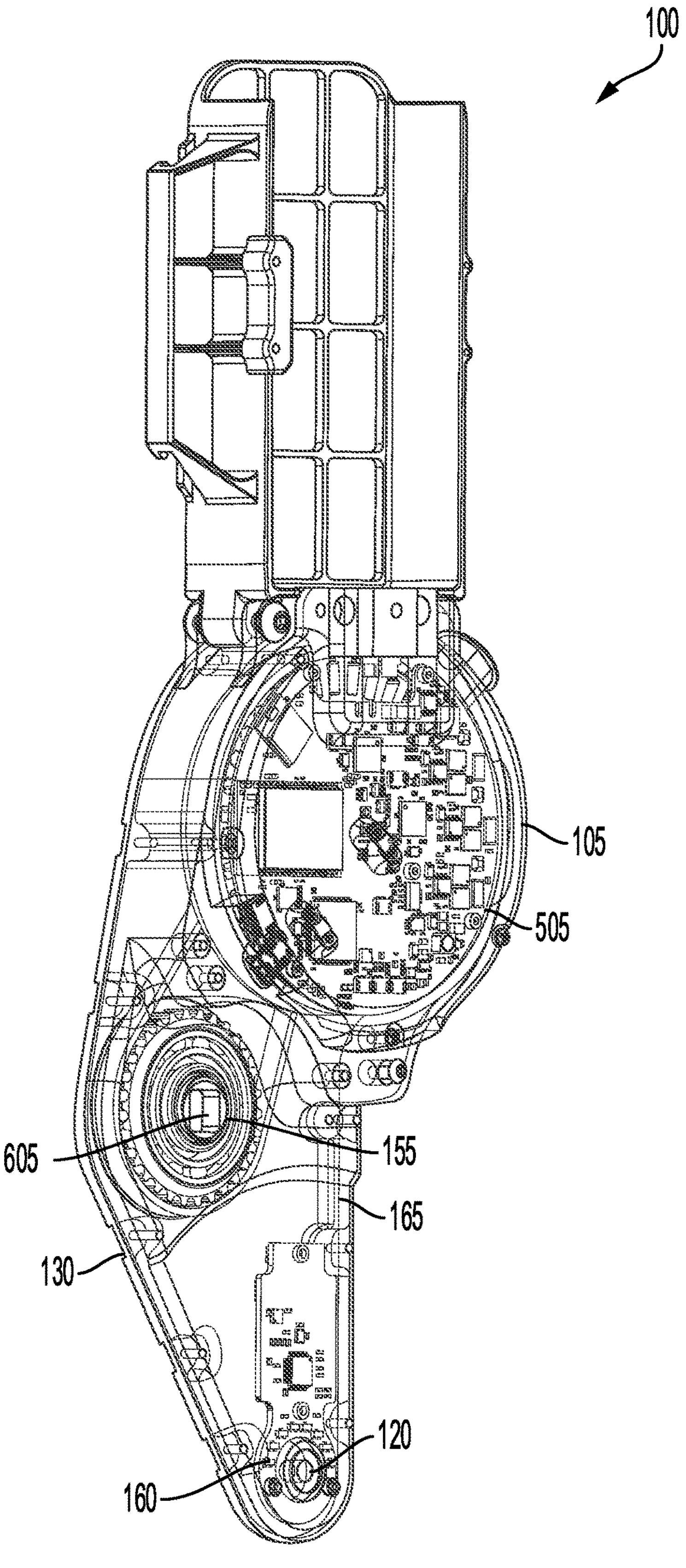
FIG. 9 illustrates a schematic diagram of an exoskeleton and internal parts, according to an embodiment.

FIG. 8 and FIG. 9 illustrate schematic diagrams of the exoskeleton 100 and internal parts. The exoskeleton 100 can include the one or more housings 105, the footplate 115, the ankle joint component 120, shin pad 125, the actuator 130, the post 150, the rotary encoder 155, the second rotary encoder 160, the sealant 165, and electronic circuitry 505 as described above. The internal parts can include an electronic circuit (e.g., circuitry). The electronic circuit can include individual electronic components (e.g., resistors, transistors, capacitors, inductors, diodes, processors, or controllers). The motor rotor can be connected to the output shaft 605.

Figure 10:
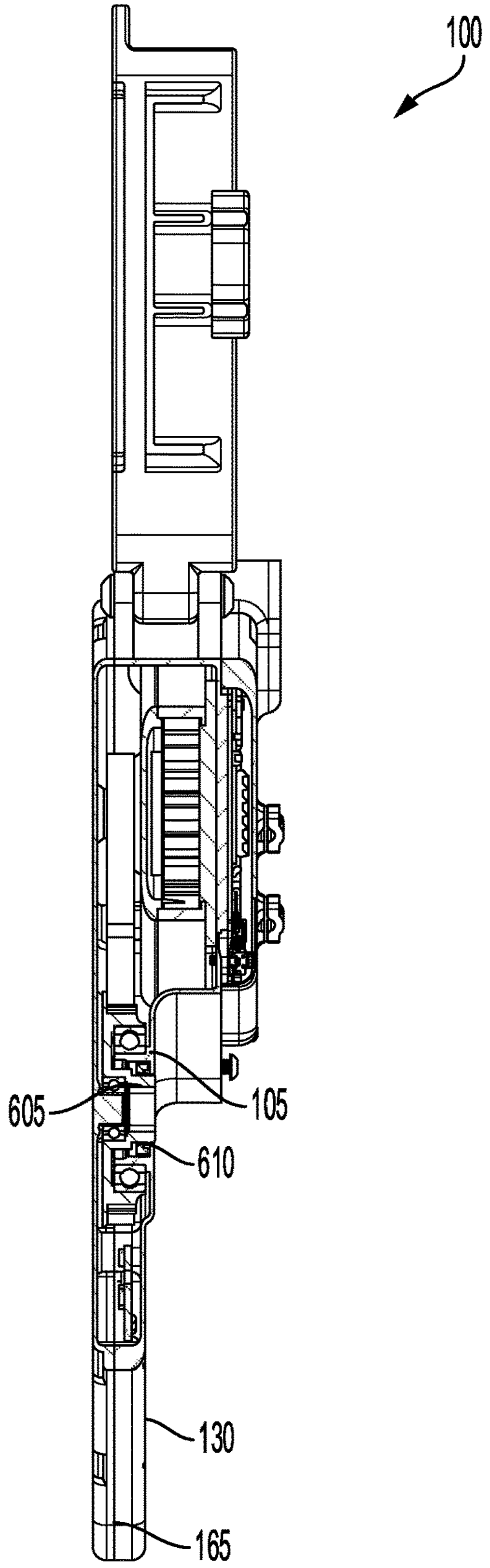
FIG. 10 illustrates a side view of an exoskeleton, according to an embodiment.

FIG. 10 illustrates a side view of the exoskeleton 100. The exoskeleton 100 can include the one or more housings 105, the actuator 130, the rotary encoder 155, the second rotary encoder 160, and the sealant 165, the output shaft 605, and the bore 610 as described above. The exoskeleton 100 can include an output shaft 605 (e.g., motor rotor). The output shaft 605 can be coupled to the electric motor. The output shaft 605 can extend through a bore 610 in a housing of the one or more housings 105 enclosing the electric motor. The bore 610 can receive the output shaft 605. A magnet can be located on a first side of the electric motor. An encoder chip can be located on the electronics board on the first side of the electric motor. The encoder chip can measure the angular position of the rotary encoder 155. An ankle shaft can extend through the second rotary encoder 160 which can increase the structural integrity of the exoskeleton 100. The exoskeleton 100 can include a transmission (e.g., gearbox) configured to couple the output shaft 605 to the electric motor. The transmission can include a machine in a power transmission system. The transmission can provide controlled application of power.

Figure 11:
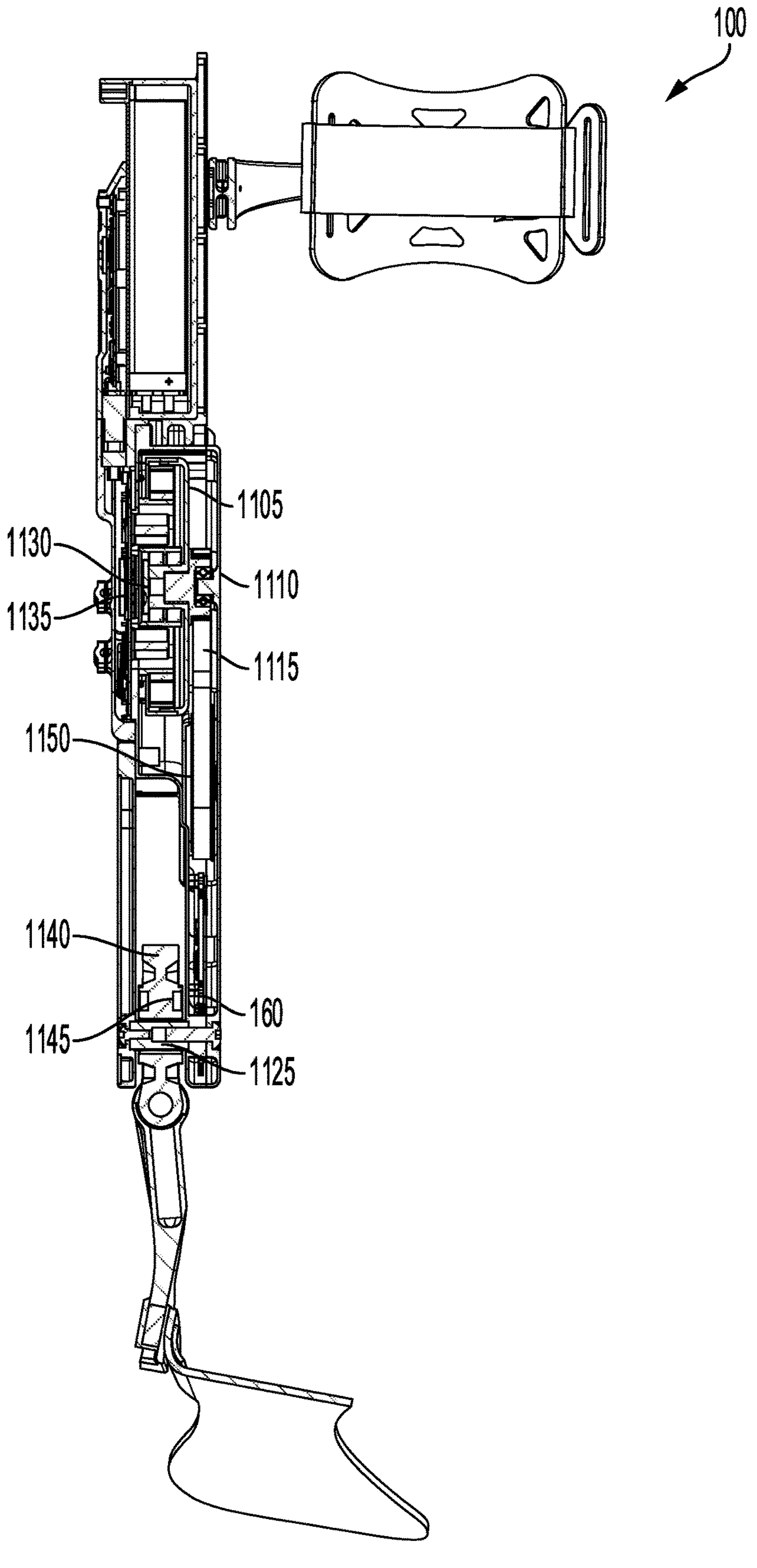
FIG. 11 illustrates a side view of an exoskeleton, according to an embodiment.

FIG. 11 illustrates a side view of an exoskeleton 100. The exoskeleton 100 can include a motor 1105 (e.g., electric motor), a motor timing pulley 1110 (e.g., timing pulley), a motor timing belt 1115 (e.g., timing belt), the second rotary encoder 160 (e.g., an ankle encoder PCB, ankle encoder printed circuit board, second rotary encoder PCB, or ankle encoder), an ankle shaft 1125, a motor encoder magnet 1130, a motor encoder 1135, a lever arm 1140 (e.g., ankle lever), and an ankle encoder magnet 1145. The ankle shaft 1125 can extend through the second rotary encoder 160 to increase the structural integrity of the exoskeleton 100. The motor timing belt 1115 can be coupled to a sprocket 1150. The sprocket 1150 can be coupled with a spool. The motor encoder magnet 1130 can be located on the first side of the electric motor.

Figure 12:
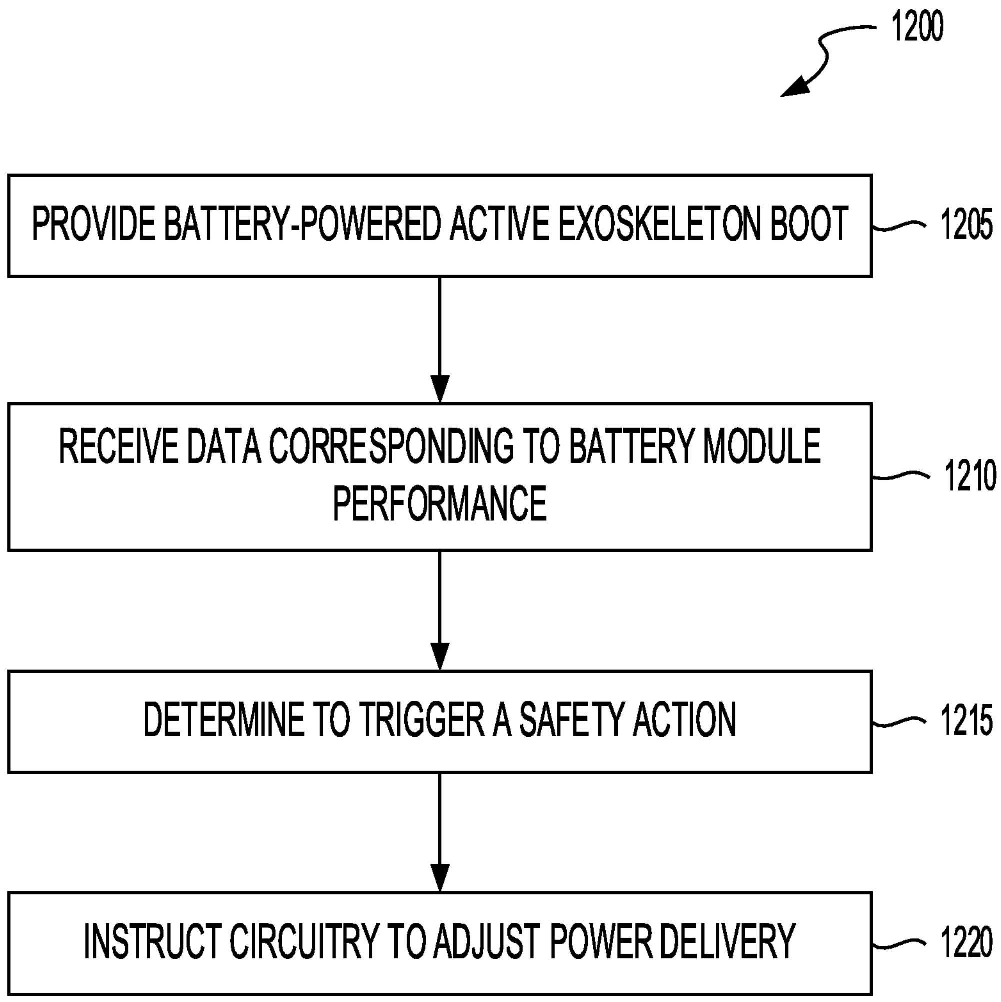
FIG. 12 illustrates a method of augmenting user motion, according to an embodiment.

FIG. 12 illustrates a method 1200 of augmenting user motion. The method 1200 can include providing, to a user, a battery-powered active exoskeleton boot (BLOCK 1205). The battery-powered active exoskeleton boot can include a shin pad to be coupled to a shin of a user below a knee of the user. The battery-powered active exoskeleton boot can include one or more housings enclosing electronic circuitry and an electric motor that can generate torque about an axis of rotation of an ankle joint of the user. At least one of the one or more housings can be coupled to the shin pad below the knee of the user. The battery-powered active exoskeleton boot can include a battery holder coupled to the shin pad. The battery holder can be located below the knee of the user and above the one or more housings enclosing the electronic circuitry. The battery-powered active exoskeleton boot can include a battery module removably affixed to the battery holder. The battery module can include a first power connector that electrically couples to a second power connector located in the battery holder while attached to the battery holder to provide electric power to the electronic circuitry and the electric motor. The battery-powered active exoskeleton boot can include an output shaft coupled to the electric motor and extending through a bore in a housing of the one or more housings enclosing the electric motor. The electronic circuitry can control delivery of power from the battery module to the electric motor to generate torque about the axis of rotation of the ankle joint of the user.

In some embodiments, the first power connector includes a blade connector. The second power connector can include a receptacle configured to receive the blade connector absent an exposed cable. The battery module can include a plurality of battery cells 305. The battery module can include a printed circuit board soldered to the plurality of battery cells 305. The battery module can include one or more battery balancers configured to actively transfer energy from a first battery cell 305 of the plurality of battery cells 305 to a second battery cell 305 of the plurality of battery cells 305 having less charge than the first battery cell 305. The battery module can include a signal trace, on the printed circuit board, that electrically connects the plurality of battery cells 305 to the one or more battery balancers.

In some embodiments, the method 1200 includes providing, via a serial data communication port of the first power connector, at least one of battery state data, a battery test function, a smart charging function, or a firmware upgrade. The battery state data can include the health of the battery module. The battery test function can include probing the battery module. The smart charging function can include using a high voltage to charge the battery module. A pin of the first power connector that provides serial data can be further configured to receive a voltage input greater than or equal to a threshold to wake up a battery management system of the battery module.

The method 1200 can include receiving data corresponding to battery module performance (BLOCK 1210). For example, the method 1200 can include receiving, by one or more processors of the battery-powered active exoskeleton boot, data corresponding to a performance of the battery module, the data comprising one or more of a temperature, current, voltage, battery percentage. For example, the data can include a temperature from one or more temperature sensors of the computing system. The data can include a temperature from one or more temperature sensors of the battery module.

The method 1200 can include determining to trigger a safety action (BLOCK 1215). For example, the method 1200 can include determining, by the one or more processors, based on a safety policy, to trigger a safety action. The safety policy can include triggering the safety action if a threshold temperature, voltage or battery percentage is crossed. For example, the safety policy can include triggering the safety action if a temperature of one or more of the plurality of battery cells 305 is higher than a threshold temperature. The safety policy can include triggering the safety action if a battery percentage of the battery module is below a threshold battery percentage. The measured temperature can include the temperature of the printed circuit board and battery cells 305. The measured temperature can include the temperature of the printed circuit board and battery cells 305 measured in two locations. The safety policy can include triggering the safety action if a measured voltage is higher than the threshold voltage.

The method 1200 can include instructing circuitry to adjust power delivery (BLOCK 1220). For example, the method 1200 can include instructing, by the one or more processors, based on the safety action, the electronic circuitry to adjust delivery of power from the battery module to the electric motor to reduce an amount of torque generated about the axis of rotation of the ankle joint of the user. The safety action can include lowering or reducing the amount of torque generated about the axis of rotation of the ankle joint of the user. The safety action can include increasing the amount of torque generated about the axis of rotation of the ankle joint of the user.

Figure 13:
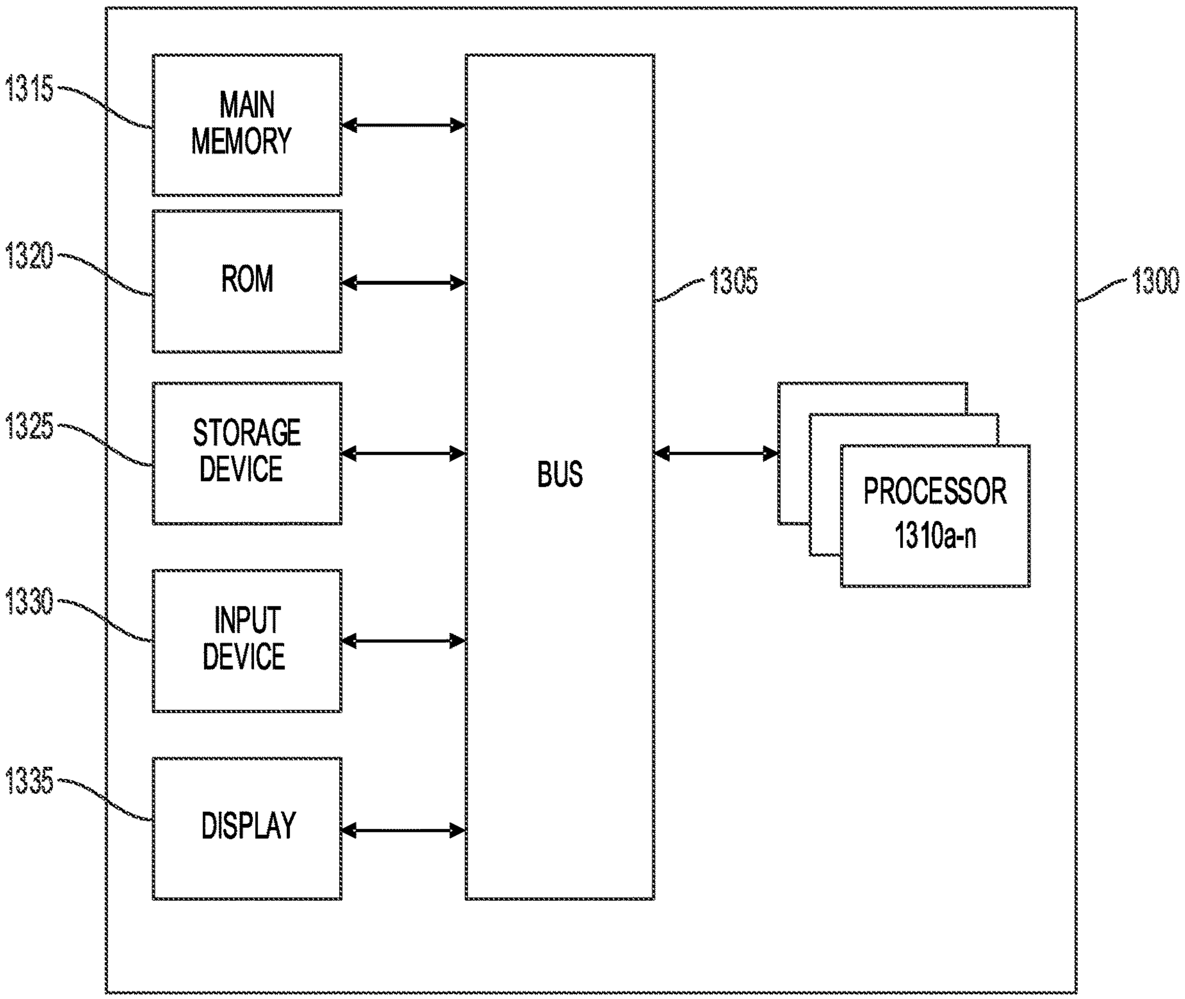
FIG. 13 illustrates a block diagram of an architecture for a computing system employed to implement various elements of the system and methods depicted in FIGS. 1-16, according to an embodiment.

FIG. 13 illustrates a block diagram of an architecture for a computing system employed to implement various elements of the system and methods depicted in FIGS. 1-16, according to an embodiment. FIG. 13 is a block diagram of a data processing system including a computer system 1300 in accordance with an embodiment. The computer system can include or execute a coherency filter component. The data processing system, computer system or computing device 1300 can be used to implement one or more components configured to process data or signals depicted in FIGS. 1-12 and 14-16. The computing system 1300 includes a bus 1305 or other communication component for communicating information and a processor 1310*a-n* or processing circuit coupled to the bus 1305 for processing information. The computing system 1300 can also include one or more processors 1310 or processing circuits coupled to the bus for processing information. The computing system 1300 also includes main memory 1315, such as a random access memory (RAM) or other dynamic storage device, coupled to the bus 1305 for storing information, and instructions to be executed by the processor 1310. Main memory 1315 can also be used for storing time gating function data, temporal windows, images, reports, executable code, temporary variables, or other intermediate information during execution of instructions by the processor 1310. The computing system 1300 may further include a read only memory (ROM) 1320 or other static storage device coupled to the bus 1305 for storing static information and instructions for the processor 1310. A storage device 1325, such as a solid state device, magnetic disk or optical disk, is coupled to the bus 1305 for persistently storing information and instructions.

The computing system 1300 may be coupled via the bus 1305 to a display 1335 or display device, such as a liquid crystal display, or active matrix display, for displaying information to a user. An input device 1330, such as a keyboard including alphanumeric and other keys, may be coupled to the bus 1305 for communicating information and command selections to the processor 1310. The input device 1330 can include a touch screen display 1335. The input device 1330 can also include a cursor control, such as a mouse, a trackball, or cursor direction keys, for communicating direction information and command selections to the processor 1310 and for controlling cursor movement on the display 1335.

The processes, systems and methods described herein can be implemented by the computing system 1300 in response to the processor 1310 executing an arrangement of instructions contained in main memory 1315. Such instructions can be read into main memory 1315 from another computer-readable medium, such as the storage device 1325. Execution of the arrangement of instructions contained in main memory 1315 causes the computing system 1300 to perform the illustrative processes described herein. One or more processors in a multi-processing arrangement may also be employed to execute the instructions contained in main memory 1315. In some embodiments, hard-wired circuitry may be used in place of or in combination with software instructions to effect illustrative implementations. Thus, embodiments are not limited to any specific combination of hardware circuitry and software.

Although an example computing system has been described in FIG. 13, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

III. Real-Time Feedback-Based Optimization of an Exoskeleton

Systems, methods and devices of the present technical solution are directed to real-time feedback-based optimization of an exoskeleton device. The real-time feedback-based optimization can be based in part on a determined or learned collaboration metric or interaction metric between a user and an exoskeleton device. A determination can be made identifying how well the exoskeleton (or multiple exoskeletons) and user wearing the exoskeletons are working together and interacting to perform a movement and/or complete a task (e.g., walk, run, jump). The exoskeleton device, such as but not limited to, an exoskeleton boot can be worn by a user on each lower limb (e.g., right leg, left leg) to aid the user in performing movements and/or activities (e.g., walking, running, hiking). The exoskeleton boots can provide force or torque to the respective limb to reduce an amount of force provided by the user to perform the movement and reduce a physiological impact on the user during the movement. The exoskeleton can augment or otherwise change a behavior of the user while performing different movements. Further, the exoskeleton device can its behavior based in part on the behavior and/or performance of the user during the movement. A controller can determine how well the user is performing, how well the exoskeleton device is performing and a collaboration metric indicating the relationship and quality of interaction between the user and the exoskeleton device in performing one or more movements and/or completing a task.

A user can wear exoskeleton devices, for example, connected to each lower limb, to perform a series of movements. A plurality of sensors can be used to determine an individual performance of the user or how well the exoskeleton device is executing. For example, the sensor data can detect a performance of the user performing the movements, including but not limited to, if the user completed the movement, moved at the correct speed, jumped to the correct height, or squatted to the correct depth. The sensor data can detect a performance of the exoskeleton device, including but not limited to, if the exoskeleton device has met engineering standards, provided the target torque or power during the movement, met actuating timing standards. Thus, the data can determine if the exoskeleton device is performing all engineering standards correctly on paper but this information may not correlate to or indicate that the user is interacting with the exoskeleton device correctly and taking advantage of the inputs or augmentation provided by the exoskeleton device appropriately. A controller may understand that the respective device is performing correctly but may not know how to improve a performance of the user or exoskeleton device. Just because the user is performing the movement correctly may not indicate that the performance of the user wearing the exoskeleton device is at the correct level or has reached its potential.

The systems, methods and techniques described herein can measure or determine a collaboration between the user and the exoskeleton device indicating how well the user and exoskeleton device are interacting to perform one or more movements and complete a task (e.g., activity). A controller of the exoskeleton device can use the collaboration metric to modify and tune the output of the exoskeleton device, for example, in real-time to increase a performance of the user wearing the exoskeleton device to a target level or to aid the user is reaching its potential and take full advantage of the aid provided by the exoskeleton device. The controller can adapt one or more control parameters provided to the exoskeleton device to increase the collaboration and interaction between the user and the exoskeleton device.

The controller can determine the collaboration metric and generate control parameters to improve a performance of the user, the exoskeleton device and increase the collaboration between the user and the exoskeleton device. The controller can use sensor data and previous control parameters (e.g., torque, power, force, velocity) to determine an effect the previous control parameters had on a performance of a user. For example, the controller can determine that when the exoskeleton device output torque at a first level the user exceeded baseline standards and when the exoskeleton device output torque at a second level the performance of the user met the baseline standards but was less than the performance of the user when receiving torque at the first level. A single movement can involve a plurality of control parameters provided to the exoskeleton device to instruct or guide how the exoskeleton device augments a users motion during the movement. The controller can identify the control parameters and associated levels of the control parameters that resulted in an increase in performance or a decrease in performance.

The sensor data and feedback on the performance of the user and the exoskeleton device can be used to determine the collaboration between the user and the exoskeleton device. In embodiments, the controller can generate an optimization method using the collaboration metrics and modified control parameters to optimize the performance metrics of the user and the exoskeleton device (e.g., battery life) in performing one or more movements and/or completing a task. The controller can use the optimization method to identify the right combination of control parameters and associated levels of the control parameters to optimize a collaboration and interaction between the user and the exoskeleton device.

The controller can measure the performance of the exoskeleton device, for example in real-time, and generate adaptive control parameters to continuously improve the collaboration between the user and the exoskeleton and the capability of the controller. Target metrics cane be established to provide goals or performance optimization levels and the controller can tune or continuously modify one or more control parameters provided to the exoskeleton device until the user and exoskeleton reach the target goals or optimization levels.

The controller can use the optimization methods or algorithms to tune or continuously modify one or more control parameters provided to the exoskeleton device and/or instructions provided to a user. The optimization method can include or incorporate artificial intelligence (AI) and machine learning techniques to adapt to the user and the exoskeleton device over time and generate a customized controller adapted to the users own physiological goals and activity goals. Every user can be different and the controller can provide a flexible optimization method that adapts to each individual user and tunes the associated control parameters based in part on the different or unique characteristics of the user. In embodiments, as the user wears the exoskeleton device more and over time as logs of exoskeleton interaction data become more prevalent as more users get experience with device, the controller can fine tune and further optimize the collaboration and interaction between the user and the exoskeleton device. The controller can generate the collaboration metric as a real-time metric to improve offline optimization. For example, using the real-time metric and for each data collection point, a relationship can be established between a performance metric and sensor data or readings to further refine and optimize the controller. The relationship between the performance metric and sensor data can be used to continually update and modify baseline or initial control parameters generated by controller for one or more other users (e.g., new users) and optimize the quality of the control parameters generated by the respective controller.

The adaptive controller can include multiple inputs to generate a plurality of control parameters. The adaptive controller can integrate each of the multiple inputs to determine appropriate levels or values for each of the plurality of control parameters and optimize a performance of the user performing different movements wearing the exoskeleton device. In embodiments, one or more or all of the control parameters can be tuned and modified in order to optimize performance and identifying which control parameters to tune or modify to change a performance can be critical. For example, in some embodiments, there can be hundreds of control parameters available to tune or modify in order to increase a performance of a user and exoskeleton device. However, identifying which of those hundreds of control parameters actually impact the performance or increase the performance can be difficult. For example, in embodiments, when a change is made to the values or parameters used to calculate a torque value, the controller may be changing how and which parameters are affecting performance.

The exoskeleton device systems described herein can collect and validate metrics and sensor data to determine which parameters impact which performance output and generate an optimization model to tune and modify the appropriate control parameters to increase or optimize a performance of a user and the exoskeleton device. In embodiments, the controller can tune control parameters including, but not limited to, augmentation, power, torque, and/or timing, to generate control strategies that take into account computation power, battery power, system weight, and/or transparent use of the exoskeleton device.

In some embodiments, the controller can use metabolic cost as a parameter for determining the efficiency or performance of an exoskeleton device. The controller can determine performance or an impact on performance by one or control parameters using the metabolic cost by comparing a performance of the user without the exoskeleton to a performance of the user participating in the same movement and wearing the exoskeleton device. The controller can determine the metabolic cost of a user performing a task without an exoskeleton device and the metabolic cost of the user performing the same task while wearing the exoskeleton device to determine what impact the control parameters applied to the exoskeleton device had on the user performing the task. By determining the metabolic cost of performing the task with and without the exoskeleton device, the controller can determine a measured benefit of the system or increase in performance of the respective control parameters. The controller can use various parameters for determining the efficiency or performance of an exoskeleton device, including but not limited to, a cost of transport (e.g., a calculation to quantify the energy efficiency of transporting mass from one location to another), net changes in metabolic values, resting metabolic values, basal metabolic rate, and/or other forms of metabolic values.

The collaboration between the exoskeleton device and a user can be determined by examining the system performance or the performance of the user and the exoskeleton together (e.g., human+exo performance) and in contrast to examining the user performance or exoskeleton performance individually.

In embodiments, changes in inertial measurement unit (IMU) measurements and joint angle measurements and a kinematic smoothness of the transfer of energy (e.g., mechanical force, mechanical torque) can be used to determine the collaboration metric between a user and an exoskeleton device. The exoskeleton device can transfer energy to the user through a mechanic force or mechanical torque causing a kinematic disturbance in the system including the user and the exoskeleton device. The kinematic smoothness or disturbance of the system as energy (e.g., mechanical force, mechanical torque) is applied to a user though the exoskeleton device can be determined using changes in inertial measurement unit (IMU) measurements and joint angle measurements as a level of force or torque is applied. A controller of the exoskeleton device can determine the kinematic disturbance and modify one or more parameter (e.g., torque, force, power) provided to the user by the exoskeleton device to reduce or minimize the kinematic disturbance. In some embodiment, the controller can increase or maximize a level of exoskeleton mechanical power provided to a user while reducing or minimizing the kinematic disturbance.

The controller can use various measurements and sensor data to determine kinematic smoothness or kinematic disturbance, for example, from sensors such as a gyroscope and/or accelerometer. The controller can use measurements from a gyroscope, including but not limited to, an average segment angular velocity, acceleration, and/or jerk. The controller can use measurements from an accelerometer, including but not limited to, an average joint angular velocity, acceleration, and/or jerk. In embodiments, the controller can determine out of plane movements to determine or measure kinematic smoothness or kinematic disturbance (e.g., does knee velocity exist in the sagittal plane or is there frontal/transverse movement imposed due to the exoskeleton device). In some embodiments, the controller can determine or measure kinematic smoothness or kinematic disturbance based in part on a gait symmetry of the user, a step width, a cadence and/or a percentage of phase time in a gait cycle (e.g., stance time).

In some embodiments, the controller can increase or maximize an exoskeleton mechanical power value while reducing or minimizing an exoskeleton torque value, for example, provide to the user through the exoskeleton device. The controller can measure and determine that for a given exoskeleton power value it can be metabolically advantageous to reduce or minimize torque. For example, power can equal a torque value multiplied by a velocity value for the exoskeleton device, thus, the controller can use low torque during periods of high velocity to produce the same or similar average power as a strategy that uses high torque during periods of low velocity. The controller can modify and tune the torque value of the exoskeleton device to assist the muscles of the user during periods of rapid contraction (e.g., high joint velocity) to provide a more metabolically efficient or advantageous environment for the user.

In embodiments, the controller can increase or maximize an exoskeleton mechanical power value while reducing or minimizing a battery power of the exoskeleton device. In some embodiments, a user that receive an increased metabolic benefit may use or require less batter power. For example, similar to muscles, motors can be more efficient at higher speeds and low torques as compared to lower speeds and high torques. Thus, the controller can augment a user during high joint velocity movements to provide an increased metabolic benefit and/or increased electric efficiency for the exoskeleton device augmenting the user during the movement.

In embodiments, the controller can increase or maximize a user's gait speed using the exoskeleton device while reducing or minimizing a battery power of the exoskeleton device. The gait speed of the user can be determined or approximated using an inertial measurement unit (IMU) measurements. For example, the controller can use one or more IMU sensors to determine or approximate step length and step period. The controller can determine the user gait speed while performing a movement using the exoskeleton device using the step length and step period. The controller can modify or tune the battery power (e.g., minimize) to increase or maximize the user's gait speed.

In embodiments, the controller can increase or maximize an exoskeleton mechanical power value while reducing or minimizing a temperature (e.g., system temperature) of the respective exoskeleton device. The system temperature can be used to determine an exoskeleton device operation efficiency value and/or an exoskeleton device electrical efficiency.

In embodiments, the controller can modify or optimize parameters (e.g., mechanical power, battery power) of an exoskeleton device while using one or more biometric inputs to increase or maximize augmentation provided to a user through the exoskeleton device. The controller can receive biomechanical measurements taken, for example, with one or more IMU sensors and pair an exoskeleton device with different tracking systems (e.g., fitness trackers) to provide greater inputs to increase or optimize a performance of the user while performing various movements using the exoskeleton device.

In some embodiments, the controller can use a joint velocity derived from the IMU data as an input to determine when to apply actuation during a gait event (e.g., gait transition) to reduce the amount of battery used to best apply an increased or maximum mechanical power via the exoskeleton device. The controller can use biometrics to determine or measure a benefit the user is receiving from the exoskeleton device and can generate updates or modifications to various control parameters of the exoskeleton device. In some embodiments, the controller can adjust or update a power profile and/or torque profile, for example, in real time to ensure the user is experiencing transparent and high fidelity augmentation through the exoskeleton device.

In embodiments, the controller can determine one or more control parameters for the exoskeleton device to modify or change how a user walks or performs during a movement to make the user more efficient. For example, some users may be more experienced with exoskeleton devices and better at using the exoskeleton devices efficiently. The controller can determine or measure an efficiency of a user and alter or modify the respective users gait during one or more movements to teach the user or until the user becomes more efficient using the exoskeleton device.

Figure 14:
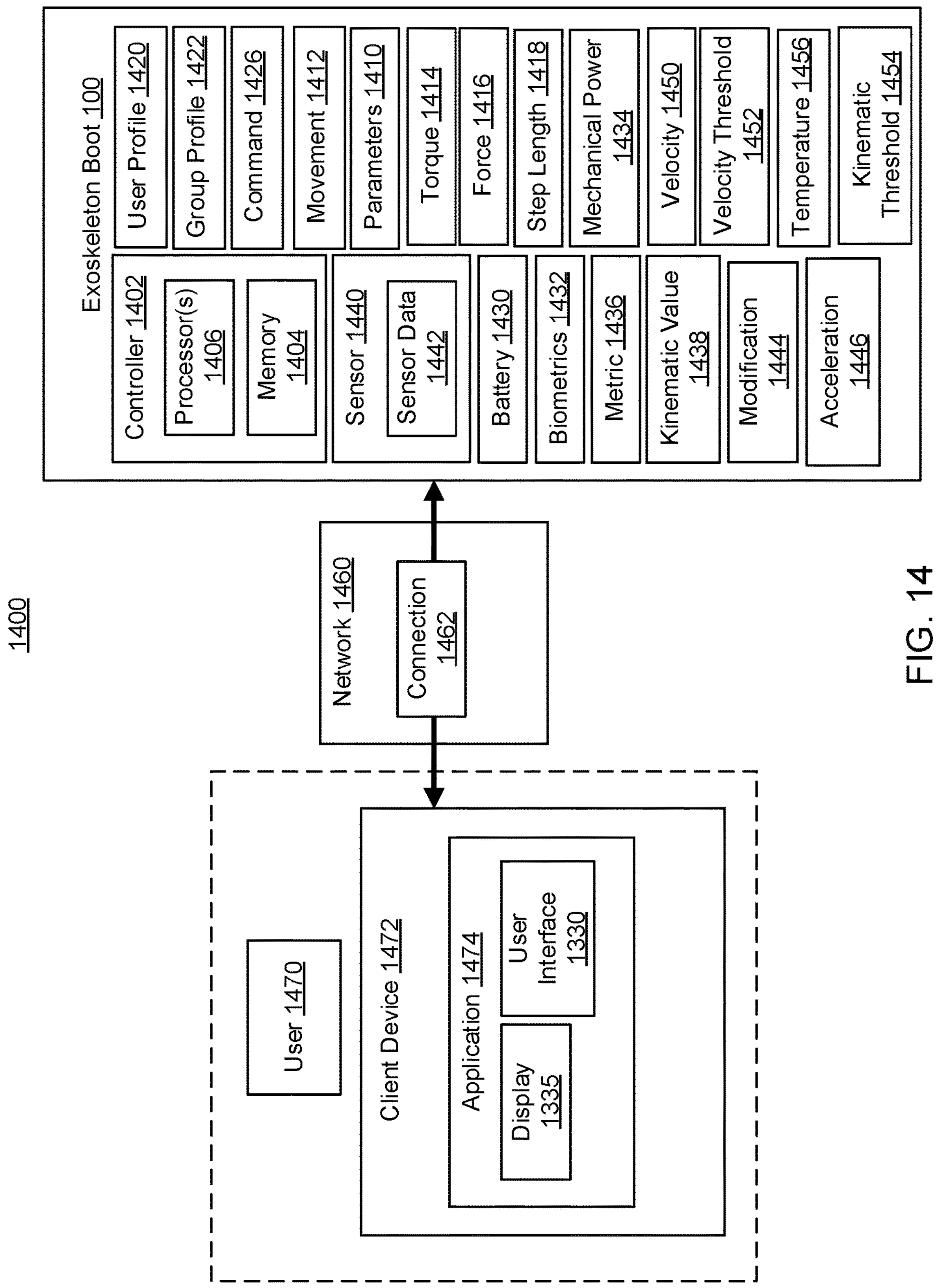
FIG. 14 is a block diagram of a system for augmenting motion via a battery-powered active exoskeleton boot in accordance with an illustrative embodiment.

Referring to FIG. 14, depicted is a block diagram of one embodiment of a system 1400 for determining a collaboration between a user 1470 and one or more exoskeleton boots 100 during one or more movements 1412. The exoskeleton boot 100 can be the same as or substantially similar to exoskeleton 100 described herein with respect to FIG. 1 or any type of exoskeleton described herein. The exoskeleton boot 100 can include one or more components to couple with a lower limb of the user 1470. In embodiment, a first exoskeleton boot 100 can couple with a first lower limb (e.g., left leg) of the user 1470 and a second exoskeleton boot 100 can couple with a second, different lower limb (e.g., right leg) of the user 1470. For example, the exoskeleton boot 100 can include a shin pad to couple to a shin of the user 1470 below a knee of the user 1470. The exoskeleton boot 100 can include one or more housings 105. At least one of the housings 105 can couple to the shin pad below the knee of the user 1470. The housings 105 can enclose or include a controller 1402 having a memory 1404 and one or more processors 1406, for example, coupled to the memory 1404. The housings 105 can enclose or include, but not limited to, an electric motor that generates to torque about an axis of rotation of an ankle joint of the user 1470. The housings 105 can provide protection for the controller 1402 and electronic motor from various environmental elements or conditions (e.g., water, rain, snow, mud, dirt) of an environment the exoskeleton boot 100 is being used or worn. The housing 105 can be formed to cover or encapsulate the electronic circuitry, sensors 1440 and/or motors, including the controller 1402 and electronic motor.

The exoskeleton boot 100 an include a controller 1402. The controller 1402 can be implemented using hardware or a combination of software and hardware. For example, each component of the controller 1402 can include logical circuitry (e.g., a central processing unit or CPU) that responses to and processes instructions fetched from a memory unit (e.g., memory 1404). Each component of the controller 1402 can include or use a microprocessor or a multi-core processor. A multi-core processor can include two or more processing units (e.g., processor 1406) on a single computing component. Each component of the controller 1402 can be based on any of these processors, or any other processor capable of operating as described herein. Each processor can utilize instruction level parallelism, thread level parallelism, different levels of cache, etc. For example, the controller 1402 can include at least one logic device such as a computing device having at least one processor 1406 to communicate, for example, with a client device 1472, display device 1335 and one or more exoskeleton boots 100. The components and elements of the controller 1402 can be separate components or a single component. The controller 1402 can include a memory component (e.g., memory 1404) to store and retrieve sensor data 1442. The memory 1404 can include a random access memory (RAM) or other dynamic storage device, for storing information, and instructions to be executed by the controller 1402 and a command modelling system of the controller 1402. The memory 1404 can include at least one read only memory (ROM) or other static storage device for storing static information and instructions for the controller 1402. The memory 1404 can include a solid state device, magnetic disk or optical disk, to persistently store information and instructions. The controller 1402 can be the same as or substantially similar to any controller or microcontroller described herein.

The controller 1402 can include or connect with a command modelling system to execute a model to generate commands 1426. The command modelling system can be implemented using hardware or a combination of software and hardware. The command modelling system can include logical circuitry (e.g., a central processing unit or CPU) that responses to and processes instructions fetched from memory 1404. The command modelling system can include a processor and/or communicate with processor 1406 to receive instructions and execute instructions (e.g., train model) received, for example, from controller 1402.

The model can include or execute a machine learning device (e.g., machine learning engine) having one or more machine learning algorithms. In embodiments, the model can be trained to predict or generate torque values 1414, force values 1416 and/or mechanical power values 1434 and generate one or more commands 1426 corresponding to the torque values 1414, force values 1416 and/or mechanical power values 1434. The machine learning device can identify patterns or similarities between different data points of the received input (e.g., sensor data 1442) and map the inputs to outputs that correspond to the identified patterns (e.g., ankle angle data, torque used to transition between walking and running in previous activities). The model can generate the commands 1426 based in part on the identified patterns in the received input data. The machine learning device can be implemented using hardware or a combination of software and hardware. In embodiments, the machine learning device can include circuitry configured to execute one or more machine learning algorithms.

The controller 1402 of the exoskeleton boot 100 can couple with or connect to (e.g., wireless connection) to a client device 1472 of a user 1470. The client device 1472 can include, but is not limited to, a computing device or a mobile device. The client device 1472 can include, but is not limited to, a phone application, smartwatch application, or computer application. The client device 1472 can include or correspond to an instance of any client device, mobile device or computer device described herein. For example, the client device 1472 can be the same as or substantially similar to computing system 300 of FIG. 3 or computing system 1300 of FIG. 13.

An application 1474 (e.g., client application) can be provided to or deployed at the client device 1472 to enable a user 1470 to interact with an exoskeleton boot 100 and controller 1402, receive feedback and/or provide feedback during one or more movements 1412 using the exoskeleton boot 100. The application 1474 can be any script, file, program, application, set of instructions, or computer-executable code, that is configured to enable a computing device (e.g., client device 1472) on which the application 1474 is executed to interact with the controller 1402 and/or exoskeleton boot 100. The application 1474 can establish a connection 1462 (e.g., session) with the controller 1402 and/or exoskeleton boot 100 to receive content from the controller 1402 and/or exoskeleton boot 100 and/or provide content to the controller 1402 and/or exoskeleton boot 100. The content can include indications of sensor data 1442 and/or performance data for one or more movements 1412.

The controller 1402 and/or exoskeleton boot 100 can couple with or connect to (e.g., wireless connection) to a display 1335 (e.g., display device), for example, of the client device 1472 and/or exoskeleton boot 100. The display 1335 can provide, for example, information to the user 1470 including but not limited to, performance data, biometrics 1432, sensor data, torque values 1414, force values 1416, battery power levels 1430, mechanical power values 1434 and/or data associated with a user 1470 performing one or more movements 1412 wearing the exoskeleton boot 100. The display 1335 can provide or display one or more visual indications. The visual indication can include a video of the user 1470 performing a movement 1412, an image of the user 1470 performing a movement 1412, a marker, menu, window or selectable content item provided through the display 1335. The visual indication can include a menu or listing of torque values 1414, force values 1416, battery power levels 1430, and/or mechanical power values 1434 available for selection through the display 1335 or user interface 1330 portion of the display 1335 (e.g., touch screen, selectable content items). The display 1335 can be the same as or substantially similar to the display 1335 described above with respect to FIG. 13.

In embodiments, a user interface 1330 (e.g., input device) can couple with or connect to the display 1335 to, for example, enable a user 1470 to interact with content provided through the display 1335. The user interface 1330 can include enable interaction with one or more visual indications provided through the display 1335 and responsive to an interaction (e.g., select, click-on, touch, hover), the user interface 1330 can generate an indication identifying a user input and/or selection of at least one content item (e.g., visual indication). The user interface 1330 can couple to or connect with the exoskeleton boot 100 to provide the indication. In some embodiments, the display 1335 can receive the indication from the user interface 1330 and transmit or provide the indication to the exoskeleton boot 100. The user interface 1330 can be the same as or substantially similar to the input device 1330 described above with respect to FIG. 13.

The controller 1402 can store and maintain data, including sensor data 1442, based in part on time intervals or time stamps corresponding to a time period when one or more movements 1412 were performed. Time intervals can include or correspond to a time period or range of time having an initial time and an end time. The number of time intervals can vary (e.g., first time interval, second time interval) and be based at least in part on a number of movements 1412 tracked, a number of users 1470, and/or an amount of sensor data 1442.

The sensor data 1442 can include, but is not limited to, motion data, force data, torque data, temperature data, speed, gait transitions, angle measurements (e.g., of different joints of the user 1470). The sensor data 1442 can include data corresponding to steady state activities or transient activities. The sensor data 1442 can include any form of data associated with, corresponding to or generated in response one or more movements 1412 performed or executed by the user 1470 wearing the exoskeleton boot 100. For example, the sensor data 1442 can include data associated with a movement 1412 or motion performed or executed by the user 1470 and/or any type of use of one or more muscles of the user 1470, for example, that may not involve motion (e.g., holding a position, standing) while wearing the exoskeleton boot 100. The sensor data 1442 can include ankle joint data, inertial measurement unit data, and/or battery data.

In embodiments, the sensor data 1442 can include historical data. The historical data can include historical sensor data 1442, historical video data and historical motion capture data. The historical sensor data 1442 can include previous sensor data 1442 associated with the user 1470 performing one or more movements 1412 or sensor data 1442 from one or more other, different users 1470 performing one or more movements 1412. The historical video data can include one or more videos, images or stream of images of the user 1470 and/or one or more other, different users 1470 performing one or more movements 1412. The historical motion capture data can include one or more recordings or images of the user 1470 and/or one or more other, different users 1470 performing one or more movements 1412. The historical motion capture data can include or correspond to data collected via the exoskeleton boot 100 in a plurality of states, for example, an unpowered state, a partially powered state, and a fully powered state. The historical motion capture data can include inertial measurement unit data, goniometer data, infrared reflector data, force plate data, electromyography (EMG) data, and heartrate data. The historical data can be received from a plurality of different systems (e.g., plurality of sensors 1440, plurality of exoskeleton boots 100, plurality of user devices 1472, plurality of controllers) and the controller 1402 can perform one or more of the following, averaging, filtering, aggregating and/or merging to process the historical data and provide to the model. For example, the controller 1402 can average the historical data to identify patterns, trends or similarities across different data points. The controller 1402 can filter the historical data to identify patterns, trends or similarities across different data points. The controller 1402 can aggregate or merge the historical data to identify patterns, trends or similarities across different data points. In embodiments, the controller 1402 can generate a data set using the historical data to provide to the model for training the model.

The sensors 1440 can include a variety of different sensors to detect or measure, such as but is not limited to, device properties, gait state, joint angles, speed, and/or body positioning information. In embodiments, the sensors 1440 can include, but are not limited to, IMU sensors, joint angle sensors, motor sensors, voltage sensors, current sensors, temperature sensors, angle sensors, positional sensors, torque sensors, force sensors, velocity, accelerations, energy sensors, power sensors, and/or battery sensors. The sensors 1440 can include inertial measurement unit (IMU) sensors, goniometer, infrared reflectors, force plates, electromyography (EMG), and/or heartrate monitors or sensors.

The controller 1402 can generate one or more thresholds to monitor a performance of a user 1470 during a movement 1412 and to determine a level of collaboration between the user 1470 and the exoskeleton boot 100. The controller 1402 can generate a velocity threshold 1452 and a kinematic threshold 1454. The velocity threshold 1452 and kinematic threshold 1454 can include a value, range of values, or a percentage. The velocity threshold 1452 and kinematic threshold 1454 can indicate a limit or magnitude that if exceeded or less than, indicates a need to generate one or more modifications 1444 to parameters 1410 of the exoskeleton boot 100. For example, the controller 1402 can use the velocity threshold 1452 to determine if the velocity 1450 of a limb or joint of the user 1470 during a movement 1412 is at an acceptable level or within an acceptable range. The controller 1402 can compare the velocity 1450 to the velocity threshold 1452 to determine whether or not to modify one or more subsequent values or parameters 1410 for the exoskeleton boot 100. The controller 1402 can use the kinematic threshold 1454 to determine if the kinematic value 1438 is at an acceptable level or within an acceptable range. The controller 1402 can compare the kinematic value 1438 to the threshold to determine whether or not to modify one or more subsequent values or parameters 1410 for the exoskeleton boot 100.

The movement 1412 can include any type of motion performed or executed by user and/or any type of use of one or more muscles of the user, for example, that may not involve motion (e.g., holding a position, standing). The movement 1412 can include, but is not limited to, physical activity, walking, running, standing, standing up, ascend or descend a surface (e.g., stairs), jogging, springing, jumping (e.g., single leg or both legs) squat, crouch, kneel or kick. In embodiments, the movement 1412 can include, but is not limited to, walking, running, gait state, gait transition (e.g., walking to running), stance begin and end, swing, swing begin and end, peak plantarflexion, peak dorsiflexion, heel strike, and/or toe off.

The commands 1426 can include an instruction, task or function generated by the model 1604 and provided to an exoskeleton boot 100 to instruct the exoskeleton boot 100 a level or amount of torque 1414, force 1416, mechanical power 1434, velocity 1450 or a combination of torque 1414, force 1416, mechanical power 1434, velocity 1450 (e.g., impedance) to generate to aid a user 1470 wearing the respective exoskeleton boot 100 in performing a movement 1412. In embodiments, the commands 1426 can include a data structure indicating a desired, requested or target torque 1414, force 1416, mechanical power 1434, and/or velocity level 1450.

The controller 1402 and/or exoskeleton 100 can establish one or more connections 1462 to communicate with one or more other controllers 1402 (e.g., controllers of other exoskeleton devices), one or more other exoskeleton boots 100 and/or one or more client devices 1472. The connection 1462 can include a link, channel, or session between two or more controllers 1402, one or more exoskeleton boots 100, and/or one or more client devices 1472. The connection 1462 can include an encrypted and/or secure sessions established between one or more controllers 1402, one or more exoskeleton boots 100, and/or one or more client devices 1472. The encrypted connection 1462 can include an encrypted file, encrypted data or traffic transmitted between the between one or more controllers 1402, one or more exoskeleton boots 100, and/or one or more client devices 1472. In embodiments, the controller 1402 can include a communications interface to enable the controller 1402 to access a computer network such as a LAN, a WAN, or the Internet through a variety of wired and/or wireless or cellular connections, for example, to establish a connection 1462.

The connection 1462 can include a wireless connection, WiFi connection, Bluetooth connection or a wired connection. In embodiments, the controller 1402 can use data (e.g., sensor data 1442) received via wireless communication (e.g., wireless connection 1462) "as-is" or the controller 1402 may extrapolate the data based on the latency measurement and derivatives of the data. For example, in one embodiment, if a first exoskeleton boot 100 receives an ankle angle measurement of X degrees, an ankle velocity of Y degrees per ms, and measured a latency of Z ms, then the controller 1402 may use a calculated ankle value of X+(Y*Z) or determine a calculated ankle value for generating one or more torque values for subsequent movements 1412 performed by a user wearing the first exoskeleton boot 100.

The exoskeleton boot 100 can include a wireless interface to communicate with one or more other exoskeletons boots 100 and/or one or more client devices 1472. The wireless interface can establish one or more wireless connections 1462 between one or more other exoskeletons boots 100 and/or one or more client devices 1472. The wireless interface can include a network interface controller to connect to the network 1460 for the respective exoskeleton boot 100 to receive data and/or transmit data to a client device 1472, controller 1402, administrator device and/or other exoskeleton boot 100. The wireless interface can include or be implemented as a network driver, wireless driver, Bluetooth device, or a WiFi driver for the exoskeleton boot 100. The network 1460 can include one or more private networks such as a local area network (LAN) or a company Intranet, and/or a public network, such as a wide area network (WAN) or the Internet.

The controller 1402 can maintain one or more user profiles 1420. The user profile 1420 can include a data structure or entry in a database of the memory 1404 of the exoskeleton boot 100 for storing and maintaining a plurality of user profiles 1420. The user profiles 1420 can be organized by user 1470 such that a unique user profile 1420 is generated and maintained for each user 1470, for example, during an initial use or operation of the exoskeleton boot 100. The user profiles 1420 can include historical sensor data for a user from one or more previous movements 1412 or activities performed by the user wearing the exoskeleton boot 100. The user profile 1420 can include sensor data 1442 generated and/or received during one or more previous movements 1412 or activities performed by the user wearing the exoskeleton boot 100. The user profile 1420 can include control parameters 1410 generated for one or more previous movements 1412 or activities performed by the user wearing the exoskeleton boot 100 and/or one or more future movements 1412 to be performed by the user wearing the exoskeleton boot 100.

The controller 1402 can maintain one or more group profiles 1422. The group profile 1422 can include a group of users 1470 involved in a common activity (e.g., military unit on a training mission, adventure group hiking) and/or a group of users having similar user characteristics (e.g., age, weight, height, gender, skill level, activity level). The group profile 1422 can include or link together a plurality of user profiles 1420 for a plurality of different users 1470. The controller 1402 can use information from multiple different users and/or user profiles 1420 to generate control parameters 1410 for one or more users 1470 linked in the group profile 1422. In some embodiments, the controller 1402 can link multiple user profiles 1420 in a group profile 1422 for communications between exoskeleton boots 100 or devices worn by the different users 1470 participating in a common or group activity. For example, the group profile 1422 can enable communications between a military unit having two or more members such that the exoskeleton boots 100 worn by each user can communicate with one or more or all of the exoskeleton boots 100 worn by any of the other users in the respective group and generate control parameters 1410 using a larger data set (e.g., sensor data 1442 from each exoskeleton boot 100 in the group).

The controller 1402 can determine and display a battery level 1430 that includes or correspond to a level of the battery of the exoskeleton boot 100, a battery life and/or a measure of the battery performance and longevity of the battery of the exoskeleton boot 100. The battery 1430 can indicate a battery status meter, a battery charge level, a remaining battery life of the battery of the exoskeleton boot 100 and/or a battery life needed to complete a movement 1412. In some embodiments, the exoskeleton boot 100 and/or application 1474 can display or provide a first battery indicator 1430 indicating a current battery status and a second battery display 1430 indicating a battery life needed to complete a current movement 1412, activity and/or mission.

The controller 1402 can determine and display a step length 1418 indicating a length of one or more steps taken or performed by the user 1470 during a current or active movement 1412. In embodiments, the controller 1402 can receive sensor data 1442 such as from a pedometer connected to the exoskeleton boot 100 or the user (e.g., shoe, watch) and continuously determine and update the step length 1418 during the movement 1412. The controller 1402 can display the step length 1418 to a user 1470 through the application 1474 and/or a display 1335 of the exoskeleton boot 100 and/or client device 1472.

The controller 1402 can determine one or more biometrics 1432 for a user 1470 during the movement 1412 of the limb using the exoskeleton boot 100 or multiple exoskeleton boots (e.g., both limbs). The controller 1402 can use the sensor data 1442 to determine biometrics 1432 for the user 1470 during the movement 1412. The biometrics 1432 can include, but are not limited to, body measurements, performance characteristics, physical characteristics (e.g., gait, rhythm of movement) and other forms of measurements or data associated with a muscle, limb or organ of the user 1470 during the movement 1412. In embodiments, the body measurements can include, but are not limited to, e.g., heart rate, body temperature, blood pressure, VO2 max measurements, heart rate variability, and muscle oxygen saturation (SmO2). In embodiments, the performance measurements can include, but are not limited to, speed, height jumped, distance traveled, gait symmetry, step width, anterior shear force measurements, cadence, percentage of time in different gait cycles, insole pressure distribution (e.g., right vs left foot, how does the individual walk—medial, lateral vs heel striker), joint power, joint torque, rotation, loading rate, and accelerations experienced at different body segments (e.g., foot, shank). In embodiments, the physical characteristics can include but are not limited to, muscle forces, muscle lengths, muscle activation (electromyography (EMG)), posture measurements during one or more movements 1412 and/or in one or more positions.

The controller 1402 can determine a metric 1436 indicating a level of collaboration between the user 1470 and one or more exoskeleton boots 100 during a movement 1412. The controller 1402 can use the metric 1436 to determine the level of collaboration between the user 1470 and the exoskeleton boots 100 or how well or efficient the user 1470 and exoskeleton boots 100 are working together to perform one or more movements 1412. In embodiments, the metric 1436 can include at least one of: a kinematic value 1438 for the level of force 1416 provided to the limb, a mechanical power 1434 provided by the exoskeleton boot 100 to the limb, or a battery power 1430 of the exoskeleton boot 100 during the movement 1412. In some embodiments, the controller 1402 can determine the metric 1436 based in part on the kinematic value 1438 and sensor data 1442, including IMU measurements and joint angle measurements. For example, the controller 1402 can determine changes in IMU measurements, joint angle measurements and the kinematic value 1438 responsive to different levels of force 1416 and/or mechanical power 1434 provided to the user 1470 through the exoskeleton boots 100.

The controller can determine a kinematic value 1438 for the system that includes the user 1470 and one or more exoskeleton boots 100. The kinematic value 1438 can include, but is not limited to, at least one of: a linear velocity of the limb, an angular velocity of the limb, a linear acceleration of the limb, an angular acceleration of the limb, a gait symmetry, a step length, a cadence of the limb, an angle of a joint, an angular velocity of a joint, or an angular acceleration of a joint. The controller 1402 can use the sensor data 1442 from one or more sensors 1440 to determine the kinematic values 1438. The kinematic values 1438 can include or correspond to a kinematic smoothness or kinematic disturbance in the system made up of the user 1470 and the exoskeleton boots 100. As used herein, kinematic smoothness or kinematic disturbance may both refer to the same value or same kinematic value 1437.

The controller 1402 can determine one or more modifications 1444 for one or more parameters 1410 of the exoskeleton boot 100, for example, in response to a kinematic value 1438 and/or velocity value 1450. The modification 1444 can include, but is not limited to, a change in a level of force 1416, a mechanical power 1434 and/or a torque 1414. The controller 1402 can generate modifications 1444 to the one or more parameters 1410 of the device or exoskeleton boots 100 for one or more subsequent movements 1412 of the limb using the exoskeleton boots 100. In some embodiments, the controller 1402 can modify, based on the metric 1436, a level of a mechanical power 1434 provided by the exoskeleton boot 100 or multiple exoskeleton boots 100 to the limb or multiple limbs during one or more subsequent movements 1412 to maintain a determined ratio between the level of the mechanical power 1434 and a battery power 1430 of the exoskeleton boot 100 during the one or more subsequent movements 1412. The controller 1402 can increase the mechanical power 1434 to reduce or minimize a kinematic value 1438 (e.g., kinematic disturbance) of the system including the user 1470 and the exoskeleton boots 100. The increase or change in the value of the value of the mechanical power 1434 can correspond to a difference between the current kinematic value 1438 and the kinematic threshold 1454.

The parameters 1410 can include or correspond to a level of torque 1414, a level of force 1416, a mechanical power 1434, a level of battery power 1430 and/or other outputs or properties of the exoskeleton boot 100. In embodiments, the controller 1402 can generate or assign the levels or amounts of the parameters 1410 (e.g., control parameters) to cause the exoskeleton boot 100 to generate a target level of torque 1414, force 1416, mechanical power 1434, battery power 1430, velocity 1450 and/or other outputs or properties of the exoskeleton boot 100. The parameters 1410 can include a command, an instruction, task or function provided to an exoskeleton boot 100 to instruct the exoskeleton boot 100 to generate indicated level or amount. The parameters 1410 can include a data structure indicating a desired, requested or target torque 1414, force 1416, mechanical power 1434, battery power 1430, velocity 1450 and/or other outputs or properties of the exoskeleton boot 100. The controller 1402 can detect, monitor, determine and/or assign values for one or more parameters 1410 of the exoskeleton boot 100, including but not limited to, torque values 1414, levels of force 1416, velocity 1450, mechanical power 1434, damping value, stiffness value, acceleration 1446, and/or temperature 1456.

The torque 1414 can include or correspond to a level of torque output or provided by the exoskeleton boot 100 to a joint and/or limb of a user 1470 to augment to motion, gait or movement of the user 1470 during a movement 1412. The controller 1402 can assign the torque 1414 for a movement 1412 and connect to one or more sensors 1440 to monitor and detect the level of the torque 1414 provided by the exoskeleton boot 100 during one or more movements 1412. The levels of force 1416 can include or correspond to a level of force output or provided by the exoskeleton boot 100 to a joint and/or limb of a user 1470 to augment to motion, gait or movement of the user 1470 during a movement 1412. The controller 1402 can assign the level of force 1416 for a movement 1412 and connect to one or more sensors 1440 to monitor and detect the level of the force 1416 provided by the exoskeleton boot 100 during one or more movements 1412. The velocity 1450 can include or correspond to a speed or velocity of the exoskeleton boot 100, a speed or velocity of a joint the exoskeleton boot 100 is connected to or assisting, and/or a speed or velocity of a limb the exoskeleton boot 100 is connected to or assisting. The controller 1402 can connect to one or more sensors 1440 to monitor and detect the velocity 1450 of the exoskeleton boot 100, joint and/or limb during one or more movements 1412.

The mechanical power 1434 can include or correspond to a output or power level of an engine or gear of the exoskeleton boot 100 and/or the exoskeleton boot 100. The controller 1402 can connect to one or more sensors 1440 to monitor and detect the level of the mechanical power 1434 of the exoskeleton boot 100 during one or more movements 1412. The acceleration 1446 can include or correspond to an acceleration of the exoskeleton boot 100, an acceleration of a joint the exoskeleton boot 100 is connected to or assisting, and/or an acceleration of a limb the exoskeleton boot 100 is connected to or assisting. In some embodiments, the acceleration 1446 can be associated with or correspond to a damping or stiffness of the exoskeleton boot 100. The controller 1402 can connect to one or more sensors 1440 to monitor and detect the acceleration 1446 of the exoskeleton boot 100, joint and/or limb during one or more movements 1412. The temperature 1456 can include or correspond to a temperature of the exoskeleton boot 100, for example, an internal temperature of one or more circuit components, circuitry, gear and/or engines of the exoskeleton boots 100. The controller 1402 can connect to one or more temperature sensors 1440 to monitor and detect the temperature 1456 of the exoskeleton boot 100.

Figure 15:
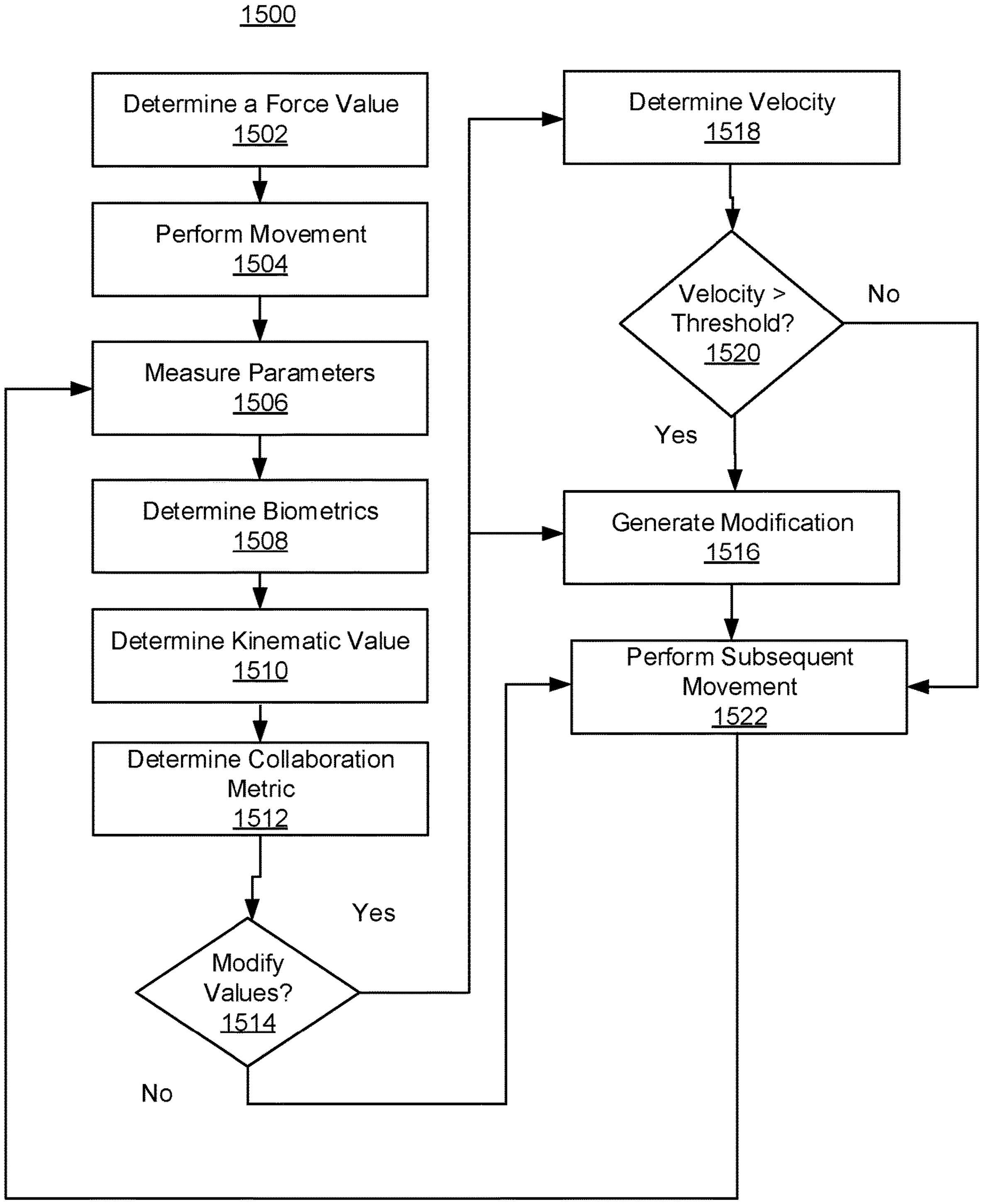
FIG. 15 illustrates a method of augmenting motion via a battery-powered active exoskeleton boot, according to an embodiment.

Referring now to FIG. 15, depicted is a flow diagram of one embodiment of a method 1500 for determining a level of collaboration between a user and an exoskeleton boot 100. In brief overview, the method 1500 can include one or more of: determining a level of force (1502), performing a movement (1504), measuring parameters (1506), determining biometrics (1508), determining a kinematic value (1510), determining a collaboration metric (1512), making a determination of whether to modify subsequent values (1514), generating a modification (1516), determining a velocity (1518), comparing the velocity to a threshold (1520), and performing a subsequent movement (1522). The functionalities of the method 1500 may be implemented using, or performed by, the components detailed herein in connection with FIGS. 1-14.

Referring now to operation (1502), and in some embodiments, a level of force 1416 can be determined. A controller 1402 of an exoskeleton boot 100 or of multiple exoskeleton boots (e.g., two exoskeleton boots 100) can determine an initial or first level of force 1416 to provide to a user 1470 through the exoskeleton boot 100 to augment or aid the user 1470 in performing a movement 1412. The level of force 1416 can include a data structure, instruction or command indicating a target, desired, or requested torque, force, velocity and/or power level for an exoskeleton boot 100 to provide to a user 1470 or limb of the user 1470 that the respective exoskeleton boot 100 is attached to or connected to and transfer the force 1416 (e.g.) to the limb of the user 1470 to augment the movement of the user 1470 during the movement 1412.

The controller 1402 can determine an initial or first level of force 1416 (e.g., first time using the exoskeleton boot 100, first time using the exoskeleton boot 100 for a particular session) based in part on characteristic of the user, a user profile 1420 for the user 1470, and/or group profile 1422 for a group of users 1470 sharing one or more characteristics (e.g., age, experience level, size) with the user 1470. The characteristics of the user 1470 can include, but are not limited to, weight, age, height, gender, experience level with exoskeleton devices, physical level (e.g., active, not active, sedentary). In embodiments, the controller 1402 can generate different levels of force 1416 for different types of people (e.g., age, size, ability, etc.), different types of gait (e.g., walking, running, jumping, etc.), different terrains (e.g., pavement, grass, sand, ice, etc.), different speeds (e.g., slow, medium, fast, etc.), and/or different target power levels (e.g., high augmentation, transparent, low, etc.). The characteristics or past performance data for the user 1470 can be maintained in a user profile 1420 for the respective user 1470. In embodiments, the controller 1402 can retrieve the user profile 1420 for the user 1470, for example, responsive to the user 1470 logging into the exoskeleton boot 100 and/or activating the exoskeleton boot 100 (e.g., turning on). In some embodiments, the controller 1402 can retrieve a group profile 1422 that the user profile 1420 of the user 1470 is included in and/or associated with based in part on at least one characteristic of the user 1470 and at least one characteristics of users included in the group profile 1422.

The device (e.g., controller 1402) can provide, using the exoskeleton boot 100, the level of force 1416 to a limb of the user 1470 to aide movement of the respective limb. In embodiments, the controller 1402 can provide, using a first exoskeleton boot and a second exoskeleton boot 100, the level of force 1416 to a first limb (e.g., left leg) and a second limb (e.g., right leg) of the user 1470 to aide movement of the respective limbs during the movement 1412 (e.g., running, walking, jumping). The controller 1402 can provide the same level or value of force to each exoskeleton boot 100 (e.g., same to each leg) or provide different levels or values of force 1416 to each exoskeleton boot 100 based in part on the user characteristics (e.g., injury to one leg, injury to an ankle on one leg).

Referring now to operation (1504), and in some embodiments, the user 1470 can perform a movement 1412 using the exoskeleton boots 100 and based in part on the determined level of force 1416. The controller 1402 can instruct or command the exoskeleton boots 100 to provide the level of force 1416 or output the level of force 1416 and aid the user 1470 in performing a movement 1412 or series of movements 1412. In embodiments, the exoskeleton boots 100 can provide the level of force 1416 to aid the user 1470 in continuing a current movement 1412 (e.g., user actively performing) or a next, subsequent movement 1412, including but not limited to, a gait event, modifying a running speed, modifying a walking speed, modifying a leg swing speed, modifying n ankle angle and/or knee angle of the user 1470.

The exoskeleton boots 100 can augment or aid the user 1470 in performing one or more movements 1412. In embodiments, the exoskeleton boots 100 can provide force, torque and/or power to lower limbs of the user 1470 the respective exoskeleton boot 100 is coupled with to augment the movement of the user 1470 during the movement 1412. The movement 1412 can include steady state activities or transient activities. The movement 1412 can vary and can include any type of movement or motion performed or executed by the user 1470 and/or any type of use of one or more muscles of the user 1470, for example, that may not involve motion (e.g., holding a position, standing). The movement 1412 (e.g., physical activity) can include, but is not limited to, walking, running, standing, standing up, ascend or descend a surface (e.g., stairs), jogging, springing, jumping (e.g., single leg or both legs) squat, crouch, kneel or kick. In embodiments, the exoskeleton boots 100 can transfer energy to the lower limb of the user 1470 to augment the motion or efficiency of the user 1470 during the movement 1412. The exoskeleton boots 100 can reduce a difficulty of performing the respective movement 1412 or multiple movements 1412 by reducing the energy or effort the user 1470 exerts to perform the respective movement 1412. In some embodiments, the movements 1412 can include an initial movement 1412 or test movement 1412 performed under determined or specific conditions to generate and obtain sensor data 1442 and/or other forms of user performance metrics. The movements 1412 can include specific actions (e.g., walk, run, jump) to test a performance of the user 1470 using the exoskeleton boots 100 and generate initial or baseline sensor data 1442. The movements 1412 can be performed in specific conditions or under test conditions, such as but not limited to, indoors, outdoors, or jumping to specific heights, where the conditions are known and can be factored with or aggregated with the associated sensor data 1442 to generate baseline sensor data 1442 and/or user performance metrics for the user 1470 and to be stored and maintained in the user profile 1420 for the user 1470. For example, different users 1470 can ambulate or move differently and the application of force 1416 (e.g., torque, power) can affect gait in different ways. The user 1470 can perform a variety of different movements 1412, steady state and transient, while wearing a plurality of sensors 1440 and one or more exoskeleton boots 100. In embodiments, the user 1470 can be videotaped or recorded being in a motion capture system to generate video data and/or motion capture data associated with the movements 1412. The movements 1412 can include test conditions that apply force 1416 to the user 1470 through the exoskeleton boots 100 to determine and learn how the specific user 1470 ambulates, moves and how a gait of the user 1470 is affected using the exoskeleton boots 100. In some embodiments, the test movements 1412 can include different power levels of the exoskeleton boots 100. For example, an ankle angle measurement may provide a first value when the exoskeleton boot 100 is unpowered and a second, different value when force 1416 is applied via a powered exoskeleton boot 100. Thus, the user 1470 can perform movements 1412 and be measured in different positions (e.g., sitting, standing) when the exoskeleton boots 100 are unpowered and powered through different training cycles to better learn movement patterns of the user 1470 (e.g., cycle 1: unpowered data, cycle 2: imperfect powered data, cycle 3: better powered data). In embodiments, the test movements 1412 can include, but are not limited to, different types of gait (e.g., walking, running, jumping), different terrains (e.g., pavement, grass, sand, ice), different speeds (e.g., slow, medium, fast), and different power levels (e.g., high augmentation, transparent, low).

Referring now to operation (1506), and in some embodiments, the device (e.g., controller 1402) can measure one or more parameters 1410 of the exoskeleton boot 100 during movement of the limb using the exoskeleton boot 100. The parameters 1410 (e.g., control parameters) can include but are not limited to, torque 1414, force 1416, velocity 1450, battery power 1430, mechanical power 1434, damping, stiffness, and acceleration 1446. The parameters 1410 can be measured or determined using one or more sensors 1440 and/or measurement instruments or devices of the respective exoskeleton boots 100 or connected to (e.g., wireless connection) the respective exoskeleton boots 100. The controller 1402 can request and receive the sensor data 1442 from the respective sensor 1440 (e.g., temperature sensor, power sensor, gyroscope, accelerometer, oxygen ($O_2$) sensor, near infrared spectroscopy (NIRS) sensors). The sensor data 1442 can include, but is not limited to, motion data, power data, force data, torque data, temperature data, speed, gait transitions, angle measurements (e.g., of different joints of the user 1470). The sensor data 1442 can include data corresponding to steady state movements 1412 or transient movements 1412. The sensor data 1442 can include any form of data associated with, corresponding to or generated in response one or more movements 1412 performed or executed by the user 1470 wearing the exoskeleton boots 100. For example, the sensor data 1442 can include data associated with a movement or motion performed or executed by the user 1470 and/or any type of use of one or more muscles of the user 1470, for example, that may not involve motion (e.g., holding a position, standing) while wearing the exoskeleton boots 100. In embodiments, the sensor data 1442 can include or correspond to data retrieved from or obtained from a video or recording of the movement 1412 performed by the user 1470. The controller 1402 can receive a video or recording of the user 1470 performing the movement 1412 and determine or obtain sensor data 1442 from the video data or motion capture data.

The controller 1402 can determine the parameters based in part on the received sensor data 1442. For, the controller 1402 can determine a temperature of the exoskeleton boots 100 based in part on temperature data received from a temperature sensor 1440 of an exoskeleton boot 100 or monitoring the exoskeleton boot 100. The controller 1402 can determine a torque 1414 generated or provided by the exoskeleton boots 100 based in part on sensor data 1442 (e.g., force data, size of the exoskeleton boot) received from one or more sensors 1440 of an exoskeleton boot 100 or monitoring the exoskeleton boot 100. The controller 1402 can determine a force 1416 generated or provided by the exoskeleton boots 100 based in part on sensor data 1442 received from one or more sensors 1440 (e.g., force meter) of an exoskeleton boot 100 or monitoring the exoskeleton boot 100. In embodiments, the controller 1402 can determine a battery power 1430 of the exoskeleton boots 100 based in part on sensor data 1442 received from one or more sensors 1440 (e.g., battery sensor) of an exoskeleton boot 100 or monitoring the exoskeleton boot 100. The controller 1402 can determine a mechanical power 1430 of the exoskeleton boots 100 based in part on sensor data 1442 received from one or more sensors 1440 of an exoskeleton boot 100 or monitoring the exoskeleton boot 100. The controller 1402 can determine an acceleration 1446 of the exoskeleton boots 100 and/or a limb of the user 1470 based in part on sensor data 1442 received from one or more sensors 1440 of an exoskeleton boot 100 or monitoring the exoskeleton boot 100. The controller 1402 can determine a velocity 1450 of the exoskeleton boots 100 and/or a limb of the user 1470 based in part on sensor data 1442 received from one or more sensors 1440 of an exoskeleton boot 100 or monitoring the exoskeleton boot 100.

Referring now to operation (1508), and in some embodiments, the device (e.g., controller 1402) can determine one or more biometrics 1432 of the user 1470 during the movement 1412 of the limb using the exoskeleton boot 100 or multiple exoskeleton boots (e.g., both limbs). The controller 1402 can use the sensor data 1442 to determine biometrics 1432 for the user 1470 during the movement 1412. The biometrics 1432 can include, but are not limited to, body measurements, performance characteristics, physical characteristics (e.g., gait, rhythm of movement) and other forms of measurements or data associated with a muscle, limb or organ of the user 1470 during the movement 1412. In embodiments, the body measurements can include, but are not limited to, e.g., heart rate, body temperature, blood pressure, VO2 max measurements, heart rate variability, and muscle oxygen saturation (SmO2).

In embodiments, the performance measurements can include, but are not limited to, speed, height jumped, distance traveled, gait symmetry, step width, anterior shear force measurements, cadence, percentage of time in different gait cycles, insole pressure distribution (e.g., right vs left foot, how does the individual walk—medial, lateral vs heel striker), joint power, joint torque, rotation, loading rate, and accelerations experienced at different body segments (e.g., foot, shank). In embodiments, the physical characteristics can include but are not limited to, muscle forces, muscle lengths, muscle activation (electromyography (EMG)), posture measurements during one or more movements 1412 and/or in one or more positions.

Referring now to operation (1510), and in some embodiments, the device (e.g., controller 1402) can determine a kinematic value 1438 for the movement 1412 indicative of a transfer of energy between the exoskeleton boot 100 to the limb of the user 1470 during the movement 1412. The kinematic value 1438 can include, but is not limited to, at least one of: a linear velocity of the limb, an angular velocity of the limb, a linear acceleration of the limb, an angular acceleration of the limb, a gait symmetry, a step length, a cadence of the limb, an angle of a joint, an angular velocity of a joint, or an angular acceleration of a joint.

The controller 1402 can use the sensor data 1442 from one or more sensors 1440 to determine the kinematic values 1438. The kinematic values 1438 can include or correspond to a kinematic smoothness or kinematic disturbance in the system made up of the user 1470 and the exoskeleton boots 100. As used herein, kinematic smoothness or kinematic disturbance may both refer to the same value or same kinematic value 1437. The exoskeleton boots 100 can transfer energy to the user 1470 through a mechanic force or mechanical torque causing a kinematic disturbance in the system including the user 1470 and the exoskeleton boots 100, also referred to as a kinematic value 1438. The kinematic value 1438 (e.g., kinematic smoothness, kinematic disturbance) of the system as energy (e.g., mechanical force, mechanical torque) is applied to the user 1470 though the exoskeleton boots 100 can be determined using changes, for example, in inertial measurement unit (IMU) measurements and joint angle measurements as a level of force or torque is applied. The controller 1402 of the exoskeleton boots 100 can determine the kinematic value 1438 and determine whether to modify one or more parameter (e.g., torque, force, power) provided to the user 1470 by the exoskeleton boots 100 to reduce or minimize the kinematic value 1438 (e.g., kinematic disturbance) and increase an efficiency or collaboration between the user 1470 and the exoskeleton boots 100. In some embodiments, the controller 1402 can increase or maximize a level of exoskeleton mechanical power 1434 provided to the user 1470 while reducing or minimizing the kinematic value 1438. The controller 1402 can use various measurements and sensor data 1442 to determine the kinematic value 1438, for example, from sensors 1440 such as a gyroscope and/or accelerometer. The controller 1402 can use measurements from a gyroscope, including but not limited to, an average segment angular velocity, acceleration, and/or jerk. The controller 1402 can use measurements from an accelerometer, including but not limited to, an average joint angular velocity, acceleration, and/or jerk. In embodiments, the controller 1402 can determine out of plane movements to determine or measure the kinematic value 1438 (e.g., does knee velocity exist in the sagittal plane or is there frontal/transverse movement imposed due to the exoskeleton device). In some embodiments, the controller 1402 can determine or measure the kinematic value 1438 based in part on a gait symmetry of the user 1470, a step width, a cadence and/or a percentage of phase time in a gait cycle (e.g., stance time).

In some embodiments, the controller 1402 can determine torque profiles corresponding to or based in part on the movements 1412 performed by the user wearing the exoskeleton boot 100 and the sensor data 1442 associated with the movements 1412. In embodiments, the controller 1402 can determine the one or more torque profiles corresponding to the one or more movements 1412 based on the historical video data. The torque profile can include or represent a level of torque or torque value 1414 for the exoskeleton boot 100 to apply or provide to the lower limb of the user during a movement 1412 to augment or aid the user 1470 in performing the movement 1412. In embodiments, the torque profile can include or represent a level of force for the exoskeleton boot 100 to apply or provide to the lower limb of the user during a movement 1412 to augment or aid the user 1470 in performing the movement 1412. The torque profile can include a series of torque values 1414 (or force values) for the exoskeleton boot 100 to apply or provide to the lower limb of the user during a movement 1412 to augment or aid the user 1470 at different points or stages in the respective movement 1412 in performing and completing the movement 1412. For example, the movement 1412, such as standing up and jumping, can include a series of movements and each movement (e.g., plant foot, flex ankle, begin standing up, straighten leg, jump) can include a different toque value 1414 (e.g., standing up, walking, jumping) that the exoskeleton applies to the lower limb of the user to augment the user 1470 in performing the respective movement 1412 and thus, completing the movement 1412.

The controller 1402 can determine the torque values 1414 to generate one or more torque profiles based in part on the received sensor data 1442 and/or historical data (e.g., historical video data, historical motion capture data) that represents or includes data identifying how much aid the user 1470 may have needed in performing similar movements 1412 or movements previously. In embodiments, the torque profile can include predictions or predicted torque values 1414 that are predicted using the sensor data 1442 from the user 1470 performing one or more movements 1412 (e.g., same activities, similar activities) and/or one or more other users 1470 performing one or more movements 1412.

The controller 1402 can execute a machine learning device to receive the sensor data 1442 and predict and generate the torque values 1414 and torque profiles. The machine learning device can predict a needed or desired torque value 1414 to perform one or more movements 1412. For example, the sensor data 1442 can include data associated with the user 1470 or other users 1470 walking, running, flexing an ankle, flexing a knee or jumping. The sensor data 1442 can include conditions (e.g., environmental, user specific) that the movements 1412 were performed under such as, but not limited to, indoors, outside, in the rain, male user, female user, type of gait. The sensor data 1442 can include or correspond to historical video data of the user 1470 performing one or more movements 1412 and/or historical motion capture data of the user 1470 performing one or more movements 1412. The machine learning device can receive the sensor data 1442 including the type of movements 1412 and conditions as inputs and, for example using a machine learning algorithm, generates outputs as predicted torque values 1414 for the user 1470 to augment the user 1470 performing one or more movements 1412 in the future under the same or different conditions. In some embodiments, the inputs can include user provided inputs. For example, an administrator or user can provide data to modify or aggregate with the sensor data 1442. The user provided inputs can include data associated with the user 1470 performing one or more movements 1412, user physical parameters, user measurements, and biometrics. The machine learning device 1606 can predict torque values 1414 to augment the user 1470 transitioning between different states (e.g., active to rest, steady state to transient) and transitioning between different gaits (e.g., walking to running).

Referring now to operation (1512), and in some embodiments, the device (e.g., controller 1402) can determine, based on the one or more biometrics 1432 and the one or more parameters 1410 of the device 1472 and/or exoskeleton boot 100, a metric 1436 (e.g., collaboration metric) indicative of a collaboration between the user 1470 and the exoskeleton boot 100 during the movement 1412. The controller 1402 can use the metric 1436 to determine the level of collaboration between the user 1470 and the exoskeleton boots 100 or how well or efficient the user 1470 and exoskeleton boots 100 are working together to perform one or more movements 1412. In embodiments, the metric 1436 can be indicative of collaboration between the user 1470 and the exoskeleton boots 100 that includes at least one of: a kinematic value 1438 for the level of force 1416 provided to the limb, a mechanical power 1434 provided by the exoskeleton boot 100 to the limb, or a battery power 1430 of the exoskeleton boot 100 during the movement 1412. The controller 1402 can determine the metric 1436 and tune or modify a level of force 1416 and/or a mechanical power 1434 provided by the exoskeleton boots 100 to reduce or minimize the kinematic disturbance.

In some embodiments, the controller 1402 can determine the metric 1436 based in part on the kinematic value 1438 and sensor data 1442, including IMU measurements and joint angle measurements. For example, the controller 1402 can determine changes in IMU measurements, joint angle measurements and the kinematic value 1438 responsive to different levels of force 1416 and/or mechanical power 1434 provided to the user 1470 through the exoskeleton boots 100. The controller 1402 can determine a relationship between a level of force 1416 and/or mechanical power and the corresponding kinematic value 1438 generated responsive to the level of force 1416 or mechanical power 1434 being applied to the user 1470 through the exoskeleton boots 100. In embodiments, the controller 1402 can determine a current kinematic value 1438 for a movement 1412 responsive to a current level of force 1416 applied to the user 1470 through the exoskeleton boots 100 and/or a mechanical power 1434 applied to the user 1470 through the exoskeleton boots 100. The metric 1436 can include or correspond to the relationship between the current kinematic value 1438 and the current level of force 1416 and/or current mechanical power 1434. In some embodiments, the controller 1402 can determine a change in a previous or current kinematic value responsive to the level of force 1416 and/or the mechanical power 1434. The metric 1436 can include or correspond to the relationship between the current kinematic value 1438 and the current level of force 1416 and/or current mechanical power 1434.

Referring now to operation (1514), and in some embodiments, the device (e.g., controller 1402) can make a determination of whether to modify one or more subsequent values for the exoskeleton boots 100. The controller 1402 can determine whether to modify the level of force 1416, torque 1414 and/or mechanical power 1434 applied to the user 1470 through the exoskeleton boots 100 for a current movement 1412 and/or one or more subsequent movements 1412. The controller 1402 can use a kinematic threshold 1454 to determine if the kinematic value 1438 is at an acceptable level or within an acceptable range. The kinematic threshold 1454 can include a value, percentage, a range of values or a range of percentages. For example, in some embodiments, the controller 1402 can generate or set a range of acceptable kinematic values 1438 to determine if the user 1470 and exoskeleton boots 100 are collaborating efficiently or if the transfer of energy from the exoskeleton boot 100 to the user 1470 is appropriate. The controller 1402 can compare the kinematic value 1438 to the threshold to determine whether or not to modify one or more subsequent values. In embodiments, if the kinematic value 1438 is outside the threshold range or if the kinematic value 1438 is greater than the threshold 1454, the method 1500 can move to (1516) to generate or determine one or more modifications. In embodiments, if the kinematic value 1438 is within the threshold range or if the kinematic value 1438 is less than the threshold 1454, the method 1500 can move to (1522) to perform a subsequent movement 1412 using the same or similar values.

Referring now to operation (1516), and in some embodiments, the device (e.g., controller 1402) can generate a modification 1444. The modification 1444 can include, but is not limited to, a change in a level of force 1416, a mechanical power 1434 and/or a torque 1414. The device (e.g., controller 1402) based on the metric 1432, can generate modifications 1444 to the one or more parameters 1410 of the device or exoskeleton boots 100 for one or more subsequent movements 1412 of the limb using the exoskeleton boots 100. In some embodiments, the controller 1402 can modify, based on the metric 1432, a level of a mechanical power 1434 provided by the exoskeleton boot 100 or multiple exoskeleton boots 100 to the limb or multiple limbs during one or more subsequent movements 1412 to maintain a determined ratio between the level of the mechanical power 1434 and a battery power 1430 of the exoskeleton boot 100 during the one or more subsequent movements 1412. The controller 1402 can increase the mechanical power 1434 to reduce or minimize a kinematic value 1438 (e.g., kinematic disturbance) of the system including the user 1470 and the exoskeleton boots 100. The increase or change in the value of the value of the mechanical power 1434 can correspond to a difference between the current kinematic value 1438 and the kinematic threshold 1454.

In some embodiments, the controller 1402 can modify (e.g., increase) an exoskeleton mechanical power 1434 and modify (e.g., reduce, minimize) a torque value 1414 provided by the exoskeleton boots 100 to reduce the kinematic value 1438. The controller 1402 can measure and determine that for a given exoskeleton mechanical power value 1434 it can be metabolically advantageous to reduce or minimize torque 1414 provided by the respective exoskeleton boot 100 and increase a level of collaboration between the user 1470 and the exoskeleton boot 100. In embodiments, the mechanical power 1434 can be equal a torque value 1414 multiplied by a velocity value 1450 for the exoskeleton boot 100 and the controller 1402 can use the low torque 1414 during periods of high velocity 1450 to produce the same or similar average mechanical power 1434 as a strategy that uses high torque 1414 during periods of low velocity 1450. The controller 1402 can modify and tune the torque value 1414 of the exoskeleton boot 100 to assist the muscles of the user 1470 during periods of rapid contraction (e.g., high joint velocity) to provide a more metabolically efficient or advantageous environment for the user 1470 performing one or more movements 1412 and to increase a level of collaboration between the user 1470 and the exoskeleton boot 100.

In embodiments, the controller 1402 can modify (e.g., increase, maximize) an exoskeleton mechanical power value 1434 while reducing or minimizing a battery power 1430 of the exoskeleton boot 100 to increase a level of collaboration between the user 1470 and the exoskeleton boot 100. In some embodiments, the user 1470 can receive an increased metabolic benefit that can use or require less batter power 1430. For example, similar to muscles, motors of the exoskeleton boot 100 can be more efficient at higher speeds and low torques 1414 as compared to lower speeds and high torques 1414. The controller 1402 can modify (e.g., increase, maximize) the exoskeleton mechanical power value 1434 while reducing or minimizing a battery power 1430 of the exoskeleton boot 100 to increase a level of collaboration between the user 1470 and the exoskeleton boot 100. The controller 1402 can augment or aide the user 1470 during high joint velocity movements 1412 to provide an increased metabolic benefit and/or increased electric efficiency for the exoskeleton boot 100 augmenting the user 1470 during the movement 1412.

In embodiments, the controller 1402 can determine, using a step length 1418 of the user 1470 and a step period of the user 1470, a gait speed of the user 1470 during the movement 1412 of the limb using the exoskeleton boot 100 or multiple exoskeleton boots 100. The controller 1402 can modify, responsive to the step length 1418, a level of the battery power 1430 of the exoskeleton boot 100 or multiple exoskeleton boots 100. In embodiments, the controller 1402 can increase or maximize a user's gait speed using the exoskeleton boot 100 and reduce a batter power 1430 of the exoskeleton boot 100. The gait speed of the user 1470 can be determined or approximated using one or more IMU measurements (e.g., sensor data 1442). For example, the controller 1402 can use one or more IMU sensors 1440 to determine or approximate step length 1418 and step period. The controller 1402 can determine the user gait speed while performing a movement 1412 using the exoskeleton boot 100 using the determined step length 1418 and step period. The controller 1402 can modify or tune the battery power 1430 (e.g., minimize) to increase or maximize the user's gait speed.

In embodiments, the controller 1402 can determine a temperature 1456 of the exoskeleton boot 100 or multiple exoskeleton boots 100 responsive to the movement of the limb using the exoskeleton boot 100 or multiple exoskeleton boots 100. The controller 1402 can modify, based on the temperature 1456, a level of mechanical power 1434 provided by the exoskeleton boot 100 or multiple exoskeleton boots 100 to the limb or multiple limbs during one or more subsequent movements 1412 of the limb or multiple limbs using the exoskeleton boot 100 or multiple exoskeleton boots 100. In embodiments, the system temperature 1456 or temperature 1456 of the exoskeleton boot 100 can be used to determine the exoskeleton boot operation efficiency value and/or an exoskeleton boot electrical efficiency. The controller 1402 can tune, increase or maximize an exoskeleton mechanical power value 1434 while reducing or minimizing a temperature 1456 (e.g., system temperature) of the respective exoskeleton device.

In embodiments, the controller 1402 can modify or optimize parameters 1410 (e.g., mechanical power 1434, battery power 1430) of an exoskeleton boot 100 and use one or more biometric inputs 1432 to increase or maximize augmentation provided to the user 1470 through the exoskeleton boot 100. The controller 1402 can receive biomechanical measurements 1432 taken, for example, with one or more IMU sensors 1440 and pair an exoskeleton boot 100 with different tracking systems (e.g., fitness trackers) to provide greater inputs to increase or optimize a performance of the user 1470 while performing various movements 1412 using the exoskeleton boot 100 and/or to determine modifications 1444 to the parameters 1410 of the exoskeleton boot 100.

In some embodiments, the controller 1402 can use a joint velocity received from an IMU sensor 1440 as an input to determine when to apply actuation during a gait event (e.g., gait transition) to reduce the amount of battery 1430 used to best apply an increased or maximum mechanical power 1434 via the exoskeleton boot 100. The controller 1402 can use biometrics 1432 to determine or measure a benefit the user 1470 is receiving from the exoskeleton boot 100 and can generate updates or modifications to various control parameters 1410 of the exoskeleton boot 100. In some embodiments, the controller 1402 can adjust or update a power profile and/or torque profile, for example, in real time to ensure the user 1470 is experiencing transparent and high fidelity augmentation through the exoskeleton boot 100.

In embodiments, the controller 1402 can determine one or more control parameters 1410 for the exoskeleton boot 100 to modify or change how the user 1470 moves, walks or performs during a movement 1412 to make the user 1470 more efficient during the respective movement 1412. For example, some users 1470 may be more experienced with exoskeleton boots 100 and better at using the exoskeleton boots 100 efficiently. The controller 1402 can determine or measure an efficiency of a user 1470 and generate modifications 1444 to alter or modify the respective users 1470 gait during one or more movements 1412 to teach the user 1470 or until the user 1470 becomes more efficient using the exoskeleton boot 100.

In some embodiments, the controller 1402 can use a velocity 1450 of a limb and/or joint of the user to determine to modify one or more parameters 1410 of the exoskeleton boot 100 and the method 1500 can go to (1518). Referring now to operation (1518), and in some embodiments, the device (e.g., controller 1402) can determine a velocity 1450 of a limb and/or joint of the user 1470. The controller 1402 can use sensor data 1442, including but not limited to, an accelerometer, joint angle sensor and/or IMU sensors, to determine the velocity of one or more limbs (e.g., legs, arms) and/or one or more joints of the user 1470 during the movement 1412. In embodiments, the controller can determine that a velocity 1450 of a joint or limb of the user 1470 is greater than velocity threshold 1452 and modify, responsive to the determination, a level of mechanical power 1434 provided by the exoskeleton boot 100 to the joint and/or limb during the movement 1412 or a subsequent movement 1412. The controller 1402 can modify, responsive to the determination, a level of torque 1414 provided by the exoskeleton boot 100 to the joint or limb during the movement 1412 or subsequent movement 1412. The modification 1444 can include increasing or decreasing the level of mechanical power 1434 and torque 1414 provided by the exoskeleton boot 100.

In some embodiments, the controller can determine a velocity 1450 of a joint and/or limb of the user 1470 is greater than the velocity threshold 1452 and increase a level of mechanical power 1434 provided by the exoskeleton boot 100 to the joint or limb during the movement 1412 (or subsequent movement 1412) and decrease, responsive to the increase in the level of the mechanical power 1434, a level of the battery power 1430 of the exoskeleton boot 100 during the movement 1412 (or subsequent movement 1412).

Referring now to operation (1520), and in some embodiments, the device (e.g., controller 1402) can compare the velocity 1450 to a velocity threshold 1452 to determine if the velocity 1450 is at an acceptable level or within an acceptable range. The velocity threshold 1452 can include a value, percentage, a range of values or a range of percentages. For example, in some embodiments, the controller 1402 can generate or set a range of acceptable velocity values 1450 to determine if the user 1470 and exoskeleton boots 100 are collaborating efficiently or if the transfer of energy from the exoskeleton boot 100 to the user 1470 is appropriate. The controller 1402 can compare the velocity 1450 of a limb or joint of the user 1470 to the velocity threshold 1452 to determine whether or not to modify one or more subsequent values. In embodiments, if the velocity 1450 is outside the velocity threshold range 1452 or if the velocity 1450 is greater than the velocity threshold 1452, the method 1500 can move to (1516) to generate or determine one or more modifications. In embodiments, if the velocity 1450 is within the velocity threshold range 1452 or if the velocity 1450 is less than the velocity threshold 1452, the method 1500 can move to (1522) to perform a subsequent movement 1412 using the same or similar values.

Referring now to operation (1522), and in some embodiments, the device (e.g., controller 1402) can perform a subsequent movement 1412 can be performed using the previous parameters 1410 of the exoskeleton boots or the modified parameters 1410 of the exoskeleton boots 100. The user 1470 can perform the subsequent movement 1412 using the exoskeleton boots 100 and based in part on the determined level of force 1416, mechanical power 1434, torque 1414 and/or battery power 1430.

The controller 1402 can instruct or command the exoskeleton boots 100 to provide the level of force 1416, mechanical power 1434, torque 1414 and/or battery power 1430 based in part on whether the parameters 1410 were modified. For example, if the parameters 1410 were not modified and the kinematic value 1438 of the system was less than the kinematic threshold 1454 or within the threshold range 1454, the controller 1402 can instruct or command the exoskeleton boots 100 to provide the level of force 1416, mechanical power 1434, torque 1414 and/or battery power 1430 at the same level as the previous movement 1412 or a similar level as the previous movement 1412.

If the parameters 1410 were modified and the kinematic value 1438 of the system was greater than the kinematic threshold 1454 or outside the threshold range 1454, the controller 1402 can instruct or command the exoskeleton boots 100 to provide the level of force 1416, mechanical power 1434, torque 1414 and/or battery power 1430 using the modifications 1444 (e.g., modified levels) for the subsequent movement 1412 to increase the level of collaboration between the user 1470 and the exoskeleton boot 100 during the movement 1412. The exoskeleton boot can output the instructed level of force 1416 mechanical power 1434, torque 1414 and/or battery power 1430 to aid the user 1470 in performing the subsequent movement 1412 or series of movements 1412. The method 1500 can return to (1506) to measure one or more parameters of the subsequent movement 1412.

Figure 16:
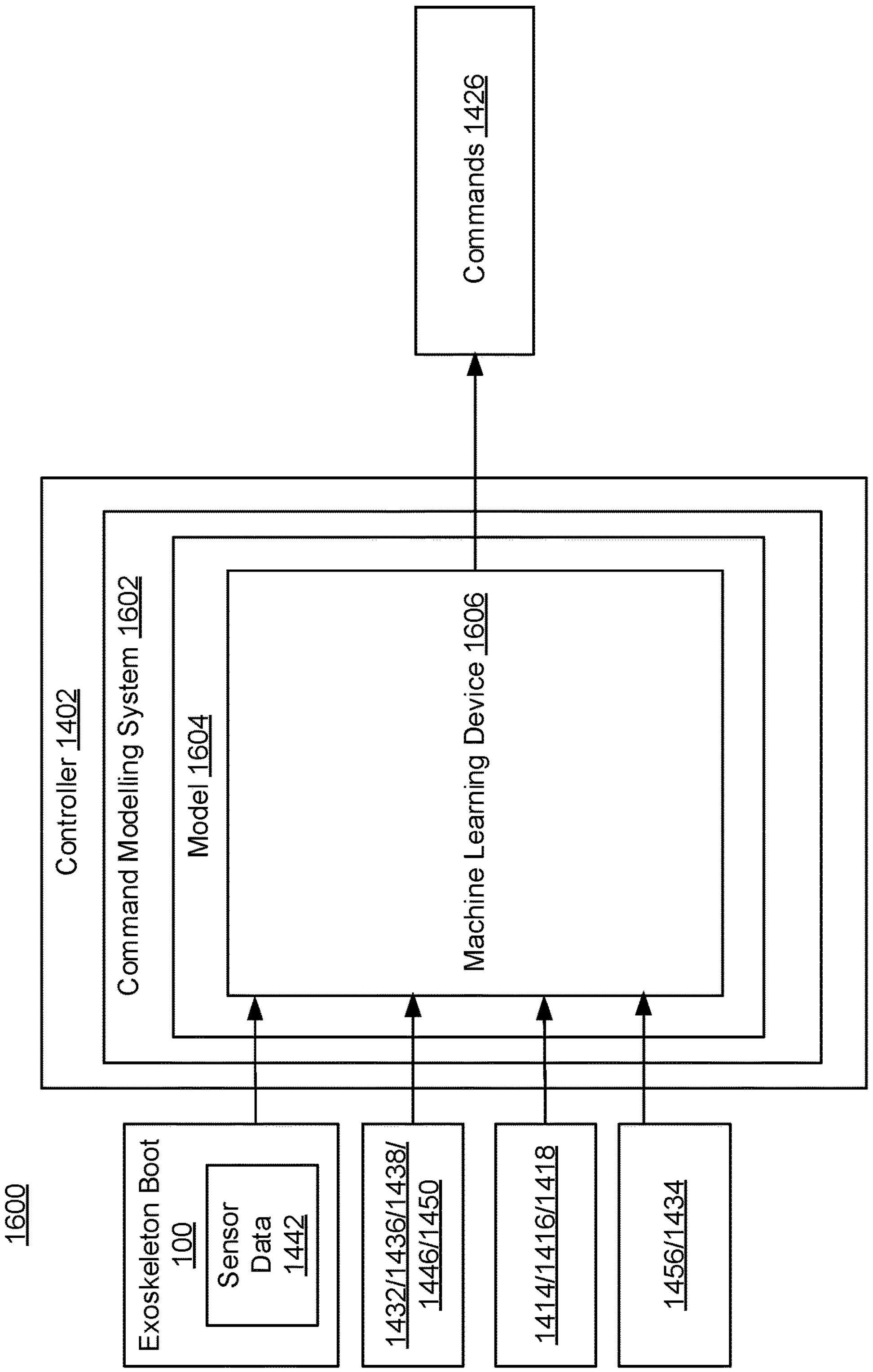
FIG. 16 is a block diagram of a system for training a model to generate one or more commands in accordance with an illustrative embodiment.

FIG. 16 is a block diagram of a system 1600 for training a model to generate one or more commands 1426 in accordance with an illustrative embodiment. In embodiments, the model 1604 can be trained using different data points (e.g., inputs) to predict and determine commands 1426 to control, for example, operation and use of an exoskeleton boot 100. The command modelling system 1602 of the controller 1402 can receive the inputs and provide the inputs to the model 1604 to train the model 1604 for one or more users 1470 of the exoskeleton device 100. The model 1604 can include a machine learning device 1606 to execute one or more machine learning algorithms and/or artificial intelligence (AI) engines to turn the received inputs into a model and one or more predictions for generating commands 1426.

The inputs can include but is not limited to, sensor data 1442, biometrics 1432, metrics 1436, kinematic values 1438, acceleration data 1446, velocity data 1450, torque values 1414, force values 1416, step lengths 1418, temperature values 1456, and/or mechanical power values 1434. The inputs can include sensor data 1442 associated with a plurality of users 1470 of varying ages, sizes and ability levels or users 1470 in a similar age range, size range and/ability range as a current user 1470 of the exoskeleton boot 100. The inputs can include sensor data 1442 associated with a plurality of different types of movements 1412, states (e.g., transient state, steady state) and/or power levels (e.g., unpowered, low power level, full power level) to learn and train the model 1604 across a variety of different movement patterns.

The command modelling system 1602 can provide one or more of the sensor data 1442, biometrics 1432, metrics 1436, kinematic values 1438, acceleration data 1446, velocity data 1450, torque values 1414, force values 1416, step lengths 1418, temperature values 1456, and/or mechanical power values 1434 to execute and train the model 1604 at a time. In some embodiments, the command modelling system 1602 can continually provide one or more of the sensor data 1442, biometrics 1432, metrics 1436, kinematic values 1438, acceleration data 1446, velocity data 1450, torque values 1414, force values 1416, step lengths 1418, temperature values 1456, and/or mechanical power values 1434 to execute and train the model 1604, for example, during a series of movements 1412 to update the model 1604 and generate new subsequent commands 1426 as a user 1470 transitions between the different movements 1412 in a series of movements 1412.

The sensor data 1442 can include real-time sensor data, for example, received as the user 1470 is performing a movement 1412 to enable the model 1604 to be trained using real-time data and generate commands 1426 using the real-time sensor data 1442. In embodiments, the users 1470 can wear the exoskeleton boots 100 and the controller 1402, through the model 1604, ca provide real-time optimization to alter commands 1426 or generate new commands 1426 to reach a desired torque value 1414. In some embodiments, the user 1470 can provide real-time feedback to the controller 1402 and model 1604, for example, through selection of a torque value 1414 (or level of augmentation or force) via a user interface 1330 and alter the users own respective torque values 1414 in real-time.

The command modelling system 1602 can receive historical data from one or more users 1470 to provide a larger data set to train the model 1604. For example, the command modelling system 1602 can provide historical sensor data 1442 from different users 1470 to provide a variety of different data points that include information on various conditions (e.g., environmental) and different type of users 1470 and generate an increased level of training data to train the model 1604 initially prior a respective user 1470 generating a determined amount of sensor data 1442 on their own.

The model 1604 can process the received inputs using the machine learning device 1606 to apply one or more machine learning algorithms and/or AI techniques to the received inputs and generate commands 1426 for instructing and controlling the exoskeleton boot 100. For example, the model 1604 can be trained to predict torque values 1414 and torque profiles and generate one or more commands 1426 corresponding to the torque values 1414. The machine learning device 1606 can identify patterns or similarities between different data points of the received input. The machine learning device 1606 can train the model 1604 to predict how the application of a particular level of torque 1414, force 1416 and/or velocity 1450 can impact the movement, gait and/or performance of the user 1470 performing one or more movements 1412. In some embodiments, the machine learning device 1606 can, for example using AI, map or determine relationships between changes in sensor data 1442 (e.g., changes in sensor readings) responsive to different levels of torque 1414, force 1416 and/or velocity 1450 provided to a lower limb of a user 1470 through the exoskeleton boot 100 to predict how the user 1470 may react to a determined levels of torque, force and/or velocity in one or more current movements 1412 or future movements 1412. For example, the machine learning device 1606 can learn or identify patterns of a torque trajectory based in part on provided sensor data 1442 (e.g., powered data, unpowered data). The model 1604 can generate commands 1426 to apply torque 1414 through at least one exoskeleton boot 100 to a lower limb of the user 1470. The model 1604 can receive subsequent or follow-up sensor data 1442 associated with the user 1470 performing movements 1412 using the exoskeleton boot 100 using the commands 1426. The machine learning device 1606 can characterize the subsequent sensor data 1442 to determine, for example, if a current level of torque 1414 is sufficient or if a previously applied torque met the respective user's 1402 needs to perform the movement 1412. The machine learning device 1606 can use the characterization to further train and update the model 1604, for example, for one or more subsequent movements 1412 performed by the user 1470.

The commands 1426 can include instructions provided to one or more components of the exoskeleton boot 100 to generate a torque value 14214 of a series of torque values 1414 forming a torque profile. The controller 1402 can determine, based on the sensor data 1442 input into the model 1604 trained via a machine learning technique based on historical motion capture data associated with one or more users 1470 performing one or more physical movements 1412, one or more commands 1426 for a second time interval subsequent to the first time interval. The model 1604 can generate the commands 1426 based in part on a movement 1412 the user 1470 is performing or is about to perform. For example, different movements 1412 can include different commands 1426 to augment a particular motion or movement of the user 1470 during the respective movement 1412. The commands 1426 can include or correspond to one or more torque profiles to be provided to the exoskeleton boot 100 that include torque values 1414 for the exoskeleton boot 100 to apply to a lower limb of the user 1470 to augment or aid the user 1470 in performing the subsequent or next movement 1412.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that can be generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium may not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement features of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various implementations.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:

determining, by one or more processors coupled with memory, a metric indicative of collaboration between a user and an exoskeleton for a foot and an ankle of the user during a movement based on the combination of one or more biomechanical measurements of the user during the movement of the foot and the ankle using the exoskeleton and one or more parameters of the exoskeleton; and controlling, by the one or more processors based on the metric, a level of a mechanical power provided by the exoskeleton to the foot and the ankle during a second movement subsequent to the movement such that the level of the mechanical power in the second movement is greater than a level of mechanical power in the movement, wherein an amount of power used by a battery of the exoskeleton during the second movement is less than an amount of power used by the battery in the movement.

2. The method of claim 1, further comprising:

generating, by the one or more processors based on the metric, modifications to the one or more parameters of the one or more processors for one or more subsequent movements of the foot and the ankle using the exoskeleton.

3. The method of claim 1, wherein the one or more parameters of the exoskeleton include at least one of: torque, velocity, battery power, mechanical power, damping or stiffness.

4. The method of claim 1, wherein determining the one or more biomechanical measurements of the user further comprises:

determining, by the one or more processors, a kinematic value for the movement indicative of a transfer of energy between the exoskeleton to the foot and the ankle limb of the user during the movement, the kinematic value including at least one of: a linear velocity of the foot and the ankle, an angular velocity of the foot and the ankle, a linear acceleration of the foot and the ankle, an angular acceleration of the foot and the ankle, a gait symmetry, a step length, a cadence of the foot and the ankle, an angle of a joint, an angular velocity of the joint, or an angular acceleration of the joint.

5. The method of claim 1, wherein the metric indicative of collaboration includes at least one of: a kinetic value for a level of force provided to the foot and the ankle, the mechanical power provided by the exoskeleton to the foot and the ankle, a motor current of the exoskeleton, or the battery power of the exoskeleton during the movement.

6. The method of claim 1, further comprising:

controlling, by the one or more processors based on the metric, the level of the mechanical power provided by the exoskeleton to the foot and the ankle during one or more subsequent movements to maintain a determined ratio between the level of the mechanical power and the amount of power provided by the battery to the exoskeleton during the one or more subsequent movements.

7. The method of claim 1, further comprising:

modifying, by the one or more processors based on the metric, the amount of power used by the battery of the exoskeleton during one or more subsequent movements to maintain a determined ratio between the amount of power used by the battery and the mechanical power provided by the exoskeleton to the foot and the ankle during the one or more subsequent movements.

8. The method of claim 1, further comprising:

determining, by the one or more processors, a velocity of a joint of the user is greater than a threshold;

modifying, by the one or more processors responsive to the determination of the velocity, the level of mechanical power provided by the exoskeleton to the foot and the ankle during the movement; and modifying, by the one or more processors responsive to the determination of the velocity, a level of torque provided by the exoskeleton to the foot and the ankle during the movement.

9. The method of claim 1, further comprising:

determining, by the one or more processors, a velocity of a joint of the user is greater than a threshold;

increasing, by the one or more processors responsive to the determination of the velocity, the level of mechanical power provided by the exoskeleton to the foot and the ankle during the movement; and decreasing, by the one or more processors responsive to the increase in the level of the mechanical power, a level of the amount of the power provided by the battery to the exoskeleton.

10. The method of claim 1, further comprising:

determining, by the one or more processors using a step length of the user and a step period of the user, a gait speed of the user during the movement of the foot and the ankle using the exoskeleton; and modifying, by the one or more processors responsive to the step length, the amount of the power provided by the battery to the exoskeleton.

11. The method of claim 1, further comprising:

determining, by the one or more processors, a temperature of the exoskeleton boot responsive to the movement of the foot and the ankle using the exoskeleton; and modifying, by the one or more processors and based on the temperature, the level of mechanical power provided by the exoskeleton to the foot and the ankle during one or more subsequent movements of the foot and the ankle using the exoskeleton.

12. A method, comprising:

determining, by a device comprising one or more processors coupled with memory, based on kinetic metrics of a movement of a foot and an ankle of a user using an exoskeleton, and kinematic metrics of the movement of the foot and the ankle using the exoskeleton, a performance value indicative of a collaboration between the user and the exoskeleton during the movement; and controlling, by the one or more processors based on the performance value, a level of a mechanical power provided by the exoskeleton to the foot and the ankle during a second movement subsequent to the movement such that the level of the mechanical power in the second movement is greater than a level of mechanical power in the movement, wherein an amount of power used by a battery of the exoskeleton during the second movement is less than an amount of power used by the battery in the movement.

13. The method of claim 12, further comprising:

determining, by the device using a joint velocity of the foot and the ankle during the movement, a time to apply actuation to the foot and the ankle using the exoskeleton during the movement.

14. The method of claim 12, further comprising:

applying, by the device to the foot and the ankle using the exoskeleton, actuation during the movement; and modifying, by the device responsive to actuation, the amount of battery power provided by the battery to the exoskeleton.

15. The method of claim 12, further comprising:

modifying, by the device based on the kinetic metrics and the kinematic metrics, at least one of: the level of mechanical power provided by the exoskeleton to the foot and the ankle during the movement, or a torque provided by the exoskeleton to the foot and the ankle during the movement.

16. The method of claim 12, further comprising:

modifying, by the device based on the kinematic metrics, one or more parameters of the exoskeleton to alter a gait of the user for one or more subsequent movements using the exoskeleton.

17. A device comprising:

a computing system comprising a processor coupled with memory, the computing system configured to:

determine a metric indicative of collaboration between a user and an exoskeleton for a foot and an ankle of the user during a movement based on a combination of one or more biomechanical measurements of the user during the movement of the foot and the ankle using the exoskeleton and one or more parameters of the exoskeleton; and control, based on the metric, a level of a mechanical power provided by the exoskeleton to the foot and the ankle during a second movement subsequent to the movement such that the level of the mechanical power in the second movement is greater than a level of mechanical power in the movement, wherein an amount of power used by a battery of the exoskeleton during the second movement is less than an amount of power used by the battery in the movement.

18. The device of claim 17, wherein the computing system is further configured to:

generate, based on the metric, modifications to the one or more parameters of the device for one or more subsequent movements of the foot and the ankle using the exoskeleton.

19. The device of claim 17, wherein the computing system is further configured to:

determine a kinematic value for the movement indicative of a transfer of energy between the exoskeleton to the foot and the ankle of the user during the movement, the kinematic value including at least one of: a linear velocity of the foot and the ankle, an angular velocity of the foot and the ankle, a linear acceleration of the foot and the ankle, an angular acceleration of the foot and the ankle, a gait symmetry, a step length, a cadence of the foot and the ankle, an angle of a joint, an angular velocity of the joint, or an angular acceleration of the joint.

20. The device of claim 17, wherein the computing system is further configured to:

modify, based on the metric, the level of a mechanical power provided by the exoskeleton to the foot and the ankle during one or more subsequent movements to maintain a determined ratio between the level of the mechanical power and the amount of power used by the battery of the exoskeleton during one or more subsequent movements.

* * * * *